(12) United States Patent
Smith

(10) Patent No.: US 11,480,136 B1
(45) Date of Patent: Oct. 25, 2022

(54) MONOPROPELLANT CONTINUOUS DETONATION ENGINES

(71) Applicant: Richard D. Smith, Kirkland, WA (US)

(72) Inventor: Richard D. Smith, Kirkland, WA (US)

( * ) Notice: Subject to any disclaimer, the term of this patent is extended or adjusted under 35 U.S.C. 154(b) by 0 days.

(21) Appl. No.: 17/564,743

(22) Filed: Dec. 29, 2021

Related U.S. Application Data

(63) Continuation-in-part of application No. 17/343,679, filed on Jun. 9, 2021.

(60) Provisional application No. 63/037,523, filed on Jun. 10, 2020, provisional application No. 63/075,073, filed on Sep. 4, 2020.

(51) Int. Cl.
| | |
|---|---|
| *F02K 9/52* | (2006.01) |
| *F02K 9/95* | (2006.01) |
| *F02K 9/42* | (2006.01) |
| *F23R 3/40* | (2006.01) |
| *F23R 3/32* | (2006.01) |
| *F02C 5/10* | (2006.01) |
| *F23R 7/00* | (2006.01) |

(52) U.S. Cl.
CPC .............. *F02K 9/95* (2013.01); *F02K 9/425* (2013.01); *F02K 9/52* (2013.01); *F23R 3/32* (2013.01); *F23R 3/40* (2013.01); *F02C 5/10* (2013.01); *F23R 7/00* (2013.01)

(58) Field of Classification Search
CPC ... F02K 9/425; F02K 9/52; F02K 9/95; F23R 3/32; F23R 3/40
See application file for complete search history.

(56) References Cited

U.S. PATENT DOCUMENTS

| | | | | |
|---|---|---|---|---|
| 6,662,550 | B2 * | 12/2003 | Eidelman | F02K 7/04 |
| | | | | 60/770 |
| 7,690,191 | B2 * | 4/2010 | Dean | F23R 7/00 |
| | | | | 60/39.38 |
| 8,230,672 | B2 | 7/2012 | Mungas et al. | |
| 8,572,946 | B2 | 11/2013 | Mungas et al. | |
| 8,858,224 | B2 | 10/2014 | Mungas et al. | |
| 9,487,310 | B2 * | 11/2016 | Soulier | F02K 9/766 |

(Continued)

OTHER PUBLICATIONS

Nicholls, J. A. and Cullen, R. E., "The Feasibility of a Rotating Detonation Wave Rocket Motor," Final Report RPL-TDR-64-113, University of Michigan, Apr. 1964, pp. 1-310. (Year: 1964).*

(Continued)

*Primary Examiner* — Lorne E Meade
(74) *Attorney, Agent, or Firm* — John J. Bamert, Esq.; Bamert Regan PLLC

(57) ABSTRACT

Embodiments are directed toward a monopropellant continuous detonation engine. In some embodiments, the continuous detonation engine includes an engine body, a monopropellant feed assembly, and a detonation initiator. The engine body defines a detonation wave channel. The monopropellant feed assembly delivers monopropellant from a monopropellant storage tank into the detonation wave channel. The detonation initiator initiates continuous detonation of the monopropellant in the detonation wave channel, preferably without a catalyst to promote decomposition of the monopropellant. Accordingly, specific impulse is increased compared to constant-pressure reaction thrusters that catalytically decompose the monopropellant with deflagration combustion.

20 Claims, 27 Drawing Sheets

(56) References Cited

U.S. PATENT DOCUMENTS

| | | | |
|---|---|---|---|
| 2003/0200753 A1* | 10/2003 | Eidelman | F02K 7/04 |
| | | | 60/776 |
| 2007/0157623 A1* | 7/2007 | Dean | F23R 7/00 |
| | | | 60/39.38 |
| 2011/0146231 A1 | 6/2011 | Mungas et al. | |
| 2018/0179961 A1* | 6/2018 | Lavertu, Jr. | F02C 3/305 |

OTHER PUBLICATIONS

Vutthivithayarak et al., Examination of the Various Cycles for Pulse Detonation Engines, Joint Propulsion Conference, Published on or before Aug. 3, 2011, USA, pp. 1-10.

Vander Wall et al., Propellant/Material Compatibility Study, National Technical Information Service, 1971, USA, pp. 1-61.

Heinrich, Propogation of Detonations in Hydrazine Vapor, Zeitschrift fuer Physikalische Chemie, Neue Folge, vol. 42, 1964, Germany, pp. 1-21.

Houseman et al., Popping Phenomena with the Hydrazine Nitrogen-Tetroxide Propellant System, Journal of Spacecraft and Rockets, USA, circa 1972, pp. 678-682.

Smith et al., Experimental Investigation of Rotating Detonation Rocket Engines for Space Propulsion, Journal of Propulsion and Power, USA, Jan. 27, 2021, pp. 1-11.

\* cited by examiner

145

MONOPROPELLANT CONTINUOUS DETONATION ENGINES

CROSS REFERENCE TO RELATED APPLICATIONS

This non-provisional application is a continuation in part of co-pending U.S. Non-Provisional application Ser. No. 17/343,679, filed Jun. 9, 2021, titled LINEAR CONTINUOUS DETONATION ROCKET ENGINES, which claims the benefit of U.S. Provisional Application No. 63/037,523, filed Jun. 10, 2020, titled LINEAR CONTINUOUS DETONATION ROCKET ENGINES, and the benefit of U.S. Provisional Application No. 63/075,073, filed Sep. 4, 2020, titled MONOPROPELLANT CONTINUOUS DETONATION ENGINES, the entirety of each of which is hereby incorporated herein by reference.

FIELD OF THE INVENTION

The invention relates generally to detonation engines and, more particularly, to continuous detonation engines fueled with a monopropellant.

BACKGROUND OF THE INVENTION

Continuous detonation engines ("CDEs") generally define circular annuli and use bipropellants with a fuel and an oxidizer separately injected through ports into the detonation zone of the circular annulus where they mix to form a detonable mixture. The partial cutaway view of FIG. 1 shows that the typical CDE 2 defines a circular annulus 4 having an upstream end portion 6 through which reactants (for example, fuel injected through the ports 8 and oxidizer represented by the arrows 10) are continuously introduced into the annulus 4 and an opposite downstream end portion 12 through which exhaust (represented by arrows 14) is expelled. After the reactants initially ignite, one or more continuous detonation waves (see the detonation wave 16) travel circumferentially (see the arrow 18) around the central axis 20 of the annulus 4 near the upstream end portion 6 of the engine 2. Downstream of the detonation zone, the reaction products travel axially through a complex pattern of spiraling shock fronts without a driving combustion following them (see shock fronts 32a-32e that emanate from the detonation wave 16) in the circular annulus 4 to exit the engine 2 at supersonic velocity with no apparent net spin imparted to the plume. In the context of CDEs, the term "detonation wave" refers to a constant-volume combustion involving a supersonic exothermic front travelling through a medium, wherein the combustion drives a leading shock (see detonation wave 16 in FIG. 1) front or wave that propagates directly in front of the combustion, and the constant-volume combustion reaction continuously reinforces the leading shock wave, which travels supersonically through undetonated medium. For this reason, CDEs are often referred to as rotating detonation engines ("RDEs"). The spiraling shock fronts 32a-32e are different from the detonation wave because they are purely acoustic, and not continuously driven by an accompanying combustion zone.

Constant-volume (isochoric) combustion was first identified in 1940 as having the potential for more efficient power cycles than the constant-pressure (deflagration) combustion used in most power cycles and rocket combustion chambers today. FIG. 2 shows a schematic representation of an idealized ZND detonation model for a detonation wave traveling through a detonable mixture or medium. A leading shock wave, traveling left to right in the model at supersonic speed through the detonable medium, generates thermodynamic conditions for gas combustion in the energy release zone behind it, and energy release from the reaction zone maintains the strength of the shock and drives it forward. This ideal self-propagating detonation wave travels at a constant velocity, termed the Chapman-Jouguet (CJ) velocity, which is generally on the order of a few thousand meters per second. FIG. 3 shows a plot graph of pressure versus time for a typical detonation wave. After a very sharp and fast pressure spike on the order of 10s of bars, the pressure falls off quickly over the course of a few milliseconds. Temperatures associated with detonation wave passage can reach several thousand Kelvins.

Early attempts to harness the potentially more efficient isochoric combustion focused on pulsed detonation engines. These devices involve repetitively filling a detonation tube with gaseous fuel and oxidizer mixture and igniting the mixture so that a detonation wave propagates down the tube to the open end through which the reaction products are expelled at supersonic speeds, thereby producing thrust for power generation or propulsion. Rotating detonation engines are a more elegant approach that does not involve opening and closing high-frequency mechanical valves, nor do RDEs require repetitive ignitions. RDEs can instead operate from a continuously pressurized plenum and require only an initial ignition.

FIGS. 4 and 5 show schematically represented pressure fields of a computational fluid dynamics ("CFD") simulation of the RDE 2 where reactants (i.e., fuel and oxidizer) are continuously fed into the upstream end portion 6 of the annulus 4, wherein the straight arrows schematically represent inflow of the reactants from micronozzles that are designed to promote the desired degree of mixing just downstream of the injector face. An initial detonation donor wave is introduced tangentially into the detonation zone to start the engine 2 and travels circumferentially through the unburned reactants. Conventional wisdom has been that all reactant in a region through which a detonation wave travels is fully consumed by such detonation wave. Moreover, the high pressure in the detonation wave 16 causes incoming flow to greatly decrease or even cease momentarily directly adjacent to the wave 16 and may in some cases cause backflow into the injection ports. Once the narrow pressure spike of the wave passes an individual port, injection flow is eventually re-established (the time required to re-establish full flow may differ for the fuel and oxidizer feeds). A detonable mixture does not accrue immediately upon re-establishment of the injection flows, let alone an ideal detonable mixture. Accordingly, detonation waves traveling in the same direction through the same region will be spaced far enough apart from each other to enable the detonable mixture to be replenished to a sufficient magnitude to support detonation.

Air-breathing RDEs, in which oxygen is diluted by the other gaseous components in air, typically exhibit one or two detonation waves, while rocket applications with pure oxygen as the oxidizer can exhibit multiple waves more or less equally spaced around the circumference. The detonation waves travel perpendicular to the propellant flow (i.e., the waves travel circumferentially) at some fraction (for example, approximately 70-80 percent) of the ideal Chapman-Jouguet velocity. The detonation waves continuously move around the circumference of the annulus 4 through unburned reactants, and the re-established injector flow replenishes the supply of unburned reactants to generate the mixture necessary to support the next detonation wave.

Without the flow replenishing the supply (and subsequently the necessary mixture) of unburned reactants prior to arrival of the next detonation wave, rotating detonation would be expected to cease due to the lack of supply of sufficiently mixed uncombusted reactants. The flow rate of incoming reactants must therefore be adequate to ensure supply of sufficiently mixed uncombusted reactants to sustain continuous rotating detonation.

Rotating detonation engines are thus mechanically simple devices that are intended to harness efficient isochoric combustion to produce steady, supersonic exit flows without the need for constricting nozzles. This relatively simple method for achieving constant-volume combustion has therefore attracted much attention from the pressure-gain combustion community, primarily as a way of achieving more efficient combustion for air-breathing applications such as gas-turbines and scramjets. In addition to the advantages of the circular shape of the annuli of RDEs as discussed above, such shape also comports with the generally circular shapes of devices such as gas-turbines and scramjets, which have circular shapes because they utilize rotating mechanical components.

Rotating detonation rocket engines ("RDREs"), often referred to as continuous detonation rocket engines ("CDREs"), are a subset of RDEs. RDREs are intended specifically for rocket propulsion applications that carry their own oxidizers rather than obtaining oxygen from ingested air. All known RDREs modelled, proposed, or tested to date have been generally circular and thus have many of the same advantages as the ingested-air RDEs described above. Most RDREs have a circular annular reaction chamber, although some have included a cylindrical reaction chamber, with no center piece to define the inner annular wall.

RDEs have several characteristics that make them attractive for rocket propulsion applications, including stability in the face of acoustic and detonative interference. Once started in detonation mode, the RDEs typically continue running until the supplies of fuel and oxidizer flows are discontinued. Standard liquid rocket engines ("LREs") are often subject to acoustic upsets such as "buzzing" or "popping", which can cause the engines to extinguish or, in the worst case, to catastrophically destruct. The stability of RDEs is believed to be due in part to RDEs having greater tolerance than LREs for changes in mixture ratio and flow rate. RDREs continue to operate in stable detonative mode in spite of large, localized variations in the mixture ratio, as long as the injector flow re-establishes before the next detonation wave and replenishes the supply of unburned reactants to support the next detonation wave. Another aspect of RDREs that provides such stability is that RDREs often exhibit more than one detonation wave moving around the annulus at the same time (co-rotation). Moreover, high-speed video over these ranges reveals extremely fast adjustments in wave number. The speed of the detonation waves apparently allows these very fast adjustments in combustion regimes to maintain stable detonation combustion in spite of transient disruptions in fuel equivalence ratios and absolute flow rates (again, as long as the injector flow re-establishes and replenishes the supply of sufficiently mixed unburned reactants to support the next detonation wave). These adjustments occur at the supersonic speeds of detonation waves, rather than at the subsonic speeds of convection and diffusion occurring in deflagration combustion. Accordingly, the circular RDEs are considered advantageous for rocket applications.

Despite these advantages of continuous detonation engines, however, incomplete mixing of separately injected fuel and oxidizer prior to arrival of a detonation wave can result in incomplete detonation. Such incomplete detonation can result in subsequent parasitic deflagration of the uncombusted reactants. The use of a monopropellant (i.e., a single propellant substance that can be made to decompose exothermically to produce hot reaction products used to produce thrust) in conventional thrusters eliminates the need for mixing of two separate feed streams, producing a more homogeneous propellant prior to combustion and leading to more complete reaction in a combustion event. The use of monopropellants also affords propulsion system advantages such as fewer propellant storage tanks, feed valves, control lines, and other plumbing, all of which reduce weight, cost, and complexity and increase system reliability.

The high pressure in the detonation wave 16, however, is believed to preclude the use of monopropellants in continuous detonation engines due to the risk of flashback (i.e., destructive propagation of detonation waves upstream through the injector valves or propellant tanks), as explained above regarding the pressure spike of the detonation wave 16. Monopropellants have been used in conventional rocket engines, but the way conventional rocket engines utilize monopropellants is not transferable to continuous detonation engines because conventional monopropellant rocket engines that utilize monopropellants (e.g., hydrazine or hydroxylamine nitrates ("HAN")) operate much differently than continuous detonation engines. Conventional monopropellant rocket engines inject the monopropellant into a catalyst bed that catalyzes a spontaneous, constant-pressure, exothermic decomposition of the monopropellant to hot, lighter gas molecules, which are then exhausted through a nozzle to produce thrust. Such monopropellant catalytic thrusters are designed to avoid the potentially destructive, constant-volume detonations that continuous detonation engines are designed to promote and maintain. Accordingly, the typical catalyst-based approach to utilizing monopropellants in conventional rocket engines is not applicable to continuous detonation engines.

Thrusters for in-space propulsion using conventional monopropellants (e.g., $N_2H_4$ (hydrazine), HAN, AF-M315E, LMP-103S) avoid unwanted flashback through judicious use of conservative thermal management to avoid overheating of the propellant feed lines, as well as strategically placed orifices in the injectors.

Conventional wisdom is that conventional monopropellants (e.g., hydrazine, HAN, AF-M315E, LMP-103S) are very difficult or close to impossible to detonate in the vapor or gaseous phase and therefore cannot be used in continuous detonation engines. In contrast, newer, more unstable monopropellants or pre-mixed bipropellants (e.g., nitrous oxide/fuel blends) are highly detonable in either phase. The conventional wisdom is that such highly detonable fuels are too dangerous for use with continuous detonation engines.

In either case, the conventional wisdom is that complex flashback barriers or arrestors are required when monopropellants are used with conventional rocket engines. Flashback barriers or arrestors generally have small orifices and tortuous paths to suppress flashbacks. Such barriers or arrestors, however, would be expected to fail at flashback prevention in a continuous detonation engine because such barriers or arrestors are designed to prevent backward propagation of flames or of only a combustion wave that occurs at only the time of initial ignition. As explained in U.S. Pat. No. 8,572,946 issued to Mungas et al. (see column 8, lines 20-51), such flame barriers prevent propagation of a flame or a combustion wave by absorbing thermal energy for a single short duration to quench a flame. After the absorption of the thermal energy from the initial combustion wave, a steady-state flame front forms downstream of the flame barrier, precluding the flame barrier or a flashback arrestor from encountering subsequent combustion waves. As a result, conventional flame barriers or flashback arrestors are designed to prevent travel of a single combustion wave or a single momentary heat transfer, not repeated encounters with detonation waves that rapidly travel the same positions over and over again for the entire duration of use of the engine as found in continuous detonation engines. Accordingly, prior flame barriers or flashback arrestors would be expected to fail at preventing flashback in a continuous detonation engine because the rapid, repeated encounters with the detonation waves would preclude the conventional flame barriers or flashback arrestors from sufficiently cooling to absorb the thermal energy of the next encountered combustion wave, eventually leading to the upstream propellant being thermally energized to its combustion temperature.

Moreover, the inventors of prior flame barriers or prior flashback arrestors failed to appropriately consider shock waves in detonation waves because the reemergence of detonation waves after quenching combustion had not yet been discovered (see, for example, paragraphs 0047 and 0052 of U.S. Pre-Grant Publication No. 2011/0146231 issued to Mungas et al., which teach quenching a detonation wave by resisting a flame front with a porous media element that absorbs thermal energy at rates higher than the rate at which a detonation wave releases thermal energy). For example, the experiments relied upon by such inventors in making their assertions regarding detonation waves monitored a combustible solid on the upstream side of a flame barrier to evaluate whether a combustion wave passed upstream through the flame barrier from an intentionally detonated downstream line filled with propellant (see, for example, lines 35-41 of column 8 of U.S. Pat. No. 8,230,672 issued to Mungas et al., which issued from U.S. patent application Ser. No. 11/950,174). Such experiments evaluate passage of combustion waves but ignore whether a shock wave passed through the barrier because a shock wave traveling through fluid (in the experiment, fluid propellant in the detonated line on the downstream side of the barrier, ambient air in the barrier, and ambient air the environment upstream of the barrier) generally fails to carry enough energy to cause a subsequently encountered solid to combust (in the experiment, the combustible solid on the upstream side of the barrier), unless the shock wave is exceptionally strong. Such experiments would therefore fail to detect whether a shock wave passed through the barrier such that a detonation wave could reestablish in gaseous or liquid monopropellant on the upstream side of the barrier. As explained in U.S. patent application Ser. No. 17/343,679, the inventor of the present application discovered that a shock wave of a detonation wave may travel a distance after quenching the constant-volume combustion that drives the shock wave (and that in combination with the shock wave defines the detonation wave), enabling the constant-volume combustion to reappear when the shock wave again encounters combustible conditions, thereby enabling the detonation wave to reappear on the other side of a zone that inhibits detonation waves. Accordingly, barriers or arrestors that prevent backward propagation of flames or combustion are insufficient to reliably prevent flashback from detonation waves if such barriers or arrestors permit passage of a shock wave.

The assertions by such inventors of prior flame barriers or prior flashback arrestors regarding dispersing shock waves in prior flame barriers or flashback arrestors also relied upon the conventional wisdom that detonation waves are permanently quenched by abrupt changes in the direction of a fluid path. In particular, such inventors believed that including an angled or cornered delivery path for fluid propellant caused shock waves of detonation waves to be dispersed (see, for example, FIG. 3 and paragraph 0053 of U.S. Pre-Grant Publication No. 2011/0146231 issued to Mungas et al.), which is the same reasoning that led to conventional continuous detonation engines as always having round detonation channels. As explained in U.S. patent application Ser. No. 17/343,679, the inventor of the present application discovered that a shock wave of a detonation wave may reflect at such corners or angled fluid paths to continue the detonation wave beyond the corner or angled transition in the detonation path (e.g., continuing upstream past the corners of the deflector in the arrestor of the '231 Publication).

Moreover, the assertions by such inventors of prior flame barriers or prior flashback arrestors regarding the ability to prevent upstream propagation of detonation waves are based on experiments that tested for upstream propagation of only a single combustion wave, not shock waves let alone repeated detonation waves that would make the barrier or arrestor incredibly hot (see paragraphs 0057 and 0076 of the '231 Publication, inspecting whether a flame or combustion wave propagated through an element). In conventional rocket engines the only detonation wave occurs upon ignition or shutdown, so the likelihood of flashback occurring is relatively low for an arrestor that only modestly impedes shock waves. In continuous detonation engines, however, detonation waves rapidly repeat travel over the same positions for the entire duration of use of the engine, as explained above. Accordingly, given both the conventional knowledge and the disclosure in U.S. patent application Ser. No. 17/343, 679, it would be expected that conventional flame barriers or flame arrestors are unacceptable for safe use of detonable monopropellants such as the newer monopropellants discussed above in continuous detonation engines because of the frequent encounters with detonation waves, thereby driving up the likelihood that flashback occurs.

For these reasons, monopropellants have been used in conventional rocket engines, but no continuous detonation engine has utilized monopropellants.

Conventional monopropellant rocket engines, however, have numerous drawbacks. For example, the catalyst draws significant power for the heaters and is a major life-limiting factor on monopropellant thrusters. Monopropellant catalysts are also expensive and are mechanically and thermally fragile. Further, catalyst bed heaters required to heat the catalyst bed to a temperature adequate to support catalytic decomposition of the monopropellant are expensive and represent a failure mode that reduces the reliability of monopropellant thrusters. To increase reliability, monopropellant thrusters often have redundant pairs of catalyst bed heaters, further increasing the cost and complexity of such thrusters. The time required to preheat catalyst beds for monopropellant thrusters is another drawback because it typically takes minutes to hours to accomplish, thereby precluding instantaneous availability of the thrusters.

For these reasons, there is a need for continuous detonation engines that avoid parasitic deflagration. There is also a need for CDEs that prevent flashback. There is a further need for CDEs that are simple to manufacture. These objects, as well as the advantages described below regarding the present invention, have been sought after for years by those of skill in the art, but to date, no CDEs have achieved such objects or provided such advantages.

SUMMARY OF THE INVENTION

It is therefore an object of the present invention to provide continuous detonation engines that prevent or reduce parasitic deflagration of un-combusted reactants.

It is also an object of the present invention to provide continuous detonation engines that achieve the above object and that also prevent flashback.

It is another object of the present invention to provide continuous detonation engines that achieve the above objects and that also are simple to manufacture.

It is a further object of the present invention to provide continuous detonation engines that achieve the above objects and that also increase the specific impulse compared to thrusters that promote constant-pressure reactions (i.e., deflagration).

It is yet another object of the present invention to provide continuous detonation engines that achieve the above objects and that also prevent or reduce parasitic endothermic decomposition of intermediate reaction products.

It is also an object of the present invention to provide continuous detonation engines that achieve the above objects and that are also shorter than existing deflagration engines.

It is another object of the present invention to provide continuous detonation engines that achieve the above objects and that also use conventional monopropellants (e.g., hydrazine, HAN, AF-M315E, LMP-103S) without catalysts.

It is a further object of the present invention to provide continuous detonation engines that achieve the above objects and that also lack a catalyst that is configured to promote deflagrative combustion.

The invention achieves the above objects, as well as other objects and advantages that will become apparent from the description that follows, by providing a monopropellant continuous detonation engine. The continuous detonation engine has an engine body, a monopropellant feed assembly, and a detonation initiator. The engine body defines a detonation wave channel. The monopropellant feed assembly selectively delivers monopropellant from a monopropellant storage tank into the detonation wave channel. The detonation initiator initiates continuous detonation of the monopropellant in the detonation wave channel.

In some embodiments, the continuous detonation engine includes a heater that promotes vaporizing of the monopropellant to increase detonability of the monopropellant. In some embodiments, the continuous detonation engine is devoid of a catalyst heater that heats a catalyst to a temperature at which the catalyst promotes decomposition of the monopropellant.

In some embodiments, the detonation initiator includes a pre-detonator assembly. In some embodiments, the pre-detonator assembly has a tube or channel fluidly coupled to the detonation wave channel. In some embodiments, the pre-detonator assembly selectively charges the tube or channel with another propellant (for example, a bipropellant) as a pre-detonator propellant. In some embodiments, the other propellant is more detonable than the monopropellant. In some embodiments, the pre-detonator detonates the other propellant in the tube or channel to generate a donor detonation wave in the tube or channel and delivers the donor detonation wave from the tube or channel to the detonation wave channel while the monopropellant resides in the detonation wave channel, preferably at least partially in the vapor state, to initiate continuous detonation of the monopropellant in the detonation wave channel. In some embodiments, the pre-detonator assembly prevents or discontinues flow of the other propellant during continuous detonation of the monopropellant or after continuous detonation of the monopropellant has been initiated. In some versions, the pre-detonator propellant includes a bipropellant.

In some embodiments, the monopropellant feed assembly is configured to prevent upstream travel of shock waves from the detonation wave channel toward the storage tank during an entirety of continuous detonation of the monopropellant in the detonation wave channel. In some embodiments, the monopropellant feed assembly defines a plurality of injection paths through which the monopropellant flows into the detonation wave channel. In some embodiments, each of the injection paths has a diameter that is less than the detonation cell size of the monopropellant as defined by a combination of the monopropellant, the monopropellant pressure, and the monopropellant temperature. In some embodiments, the monopropellant feed assembly has a plenum and a continuous-detonation barrier. In some embodiments, the plenum extends along the detonation wave channel and receives monopropellant from the storage tank. In some embodiments, the continuous-detonation barrier extends along the detonation wave channel and fluidly couples the plenum and the detonation wave channel to each other. In some embodiments, the continuous-detonation barrier defines the injection paths. In some embodiments, the continuous-detonation barrier defines discrete injection ports that fluidly couple the plenum to the detonation wave channel. In some embodiments, each of the discrete injection ports define one of the injection paths. In some embodiments, each of the discrete injection ports has a length of at least ten times the diameter.

In some embodiments, the monopropellant includes hydroxylammonium-nitrate-based propellant or ammonium-dinitramide-based propellant.

In some embodiments, the monopropellant feed assembly includes a catalyst configured to promote partial decomposition of a component of the monopropellant to improve detonability of the monopropellant. Accordingly, the continuous detonation engine facilitates initiating and sustaining continuous detonation of pre-mixed bipropellants as the monopropellant.

In some embodiments, the detonation wave channel defines a non-circular guide path. In some embodiments, the guide path includes a first end portion of the detonation wave channel and a second end portion of the wave channel opposite the first end portion. Accordingly, in some embodiments, the engine is a linear continuous detonation engine. In some embodiments, the continuous detonation engine is a continuous detonation rocket engine.

The invention also achieves the above objects, as well as other objects and advantages that will become apparent from the description that follows, by configuring the continuous detonation engine to serve as a gas generator in a system. The discharge gases of the continuous detonation engine are not used for direct propulsion. In some embodiments, the discharge gases are provided as feed stock to an electrothermal thruster, such as an arcjet. In some embodiments, the discharge gases drive a gas turbine for pumping gas or liquid, such as pumping propellant in a larger bipropellant engine.

The invention also achieves the above objects, as well as other objects and advantages that will become apparent from the description that follows, by providing a satellite, missile, or autonomous kill vehicle having the continuous detonation engine.

The invention further achieves the above objects, as well as other objects and advantages that will become apparent from the description that follows, by providing a method of operating a continuous detonation engine. The monopropellant is injected into the detonation wave channel. The method also includes initiating a detonation wave through the monopropellant in the detonation wave channel. The monopropellant is continuously injected into the detonation wave channel to promote continuous detonation of the monopropellant in the detonation wave channel. Accordingly, specific impulse is increased compared to constant-pressure reaction thrusters that catalytically decompose the monopropellant with deflagration combustion.

In some embodiments, the monopropellant is detonated without catalytic decomposition promoted by a catalytic heater.

In some embodiments, initiating the detonation wave through the monopropellant includes utilizing the pre-detonator assembly.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

A monopropellant continuous detonation engine in accordance with the principles of the invention is generally indicated at reference number 52 in the Figures of the attached drawings, wherein numbered elements in the Figures correspond to like numbered elements herein.

Figure 6:
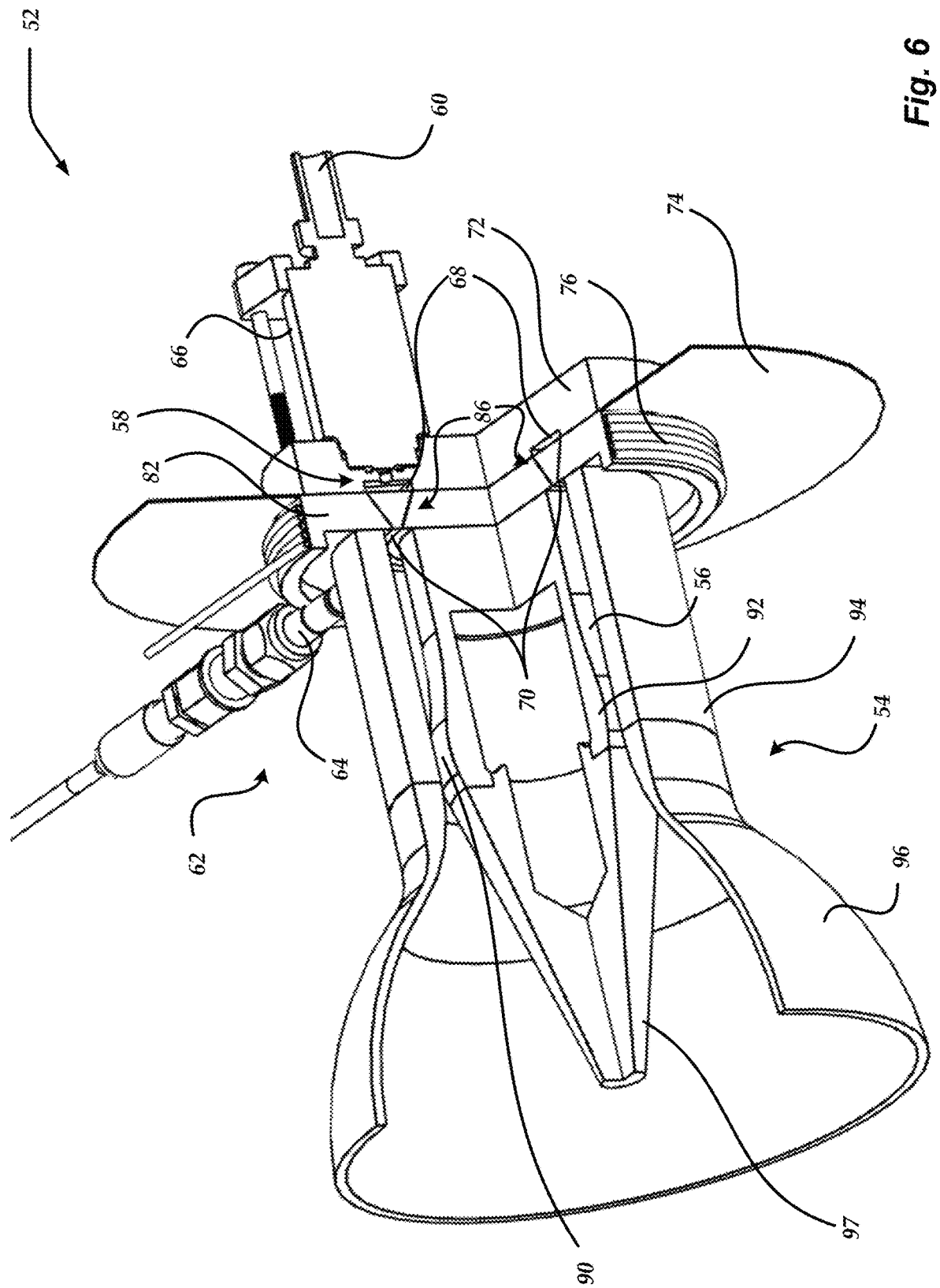
FIG. 6 is an isometric quarter-sectional view of a monopropellant continuous detonation engine in accordance with the principles of the invention.
Figure 7:
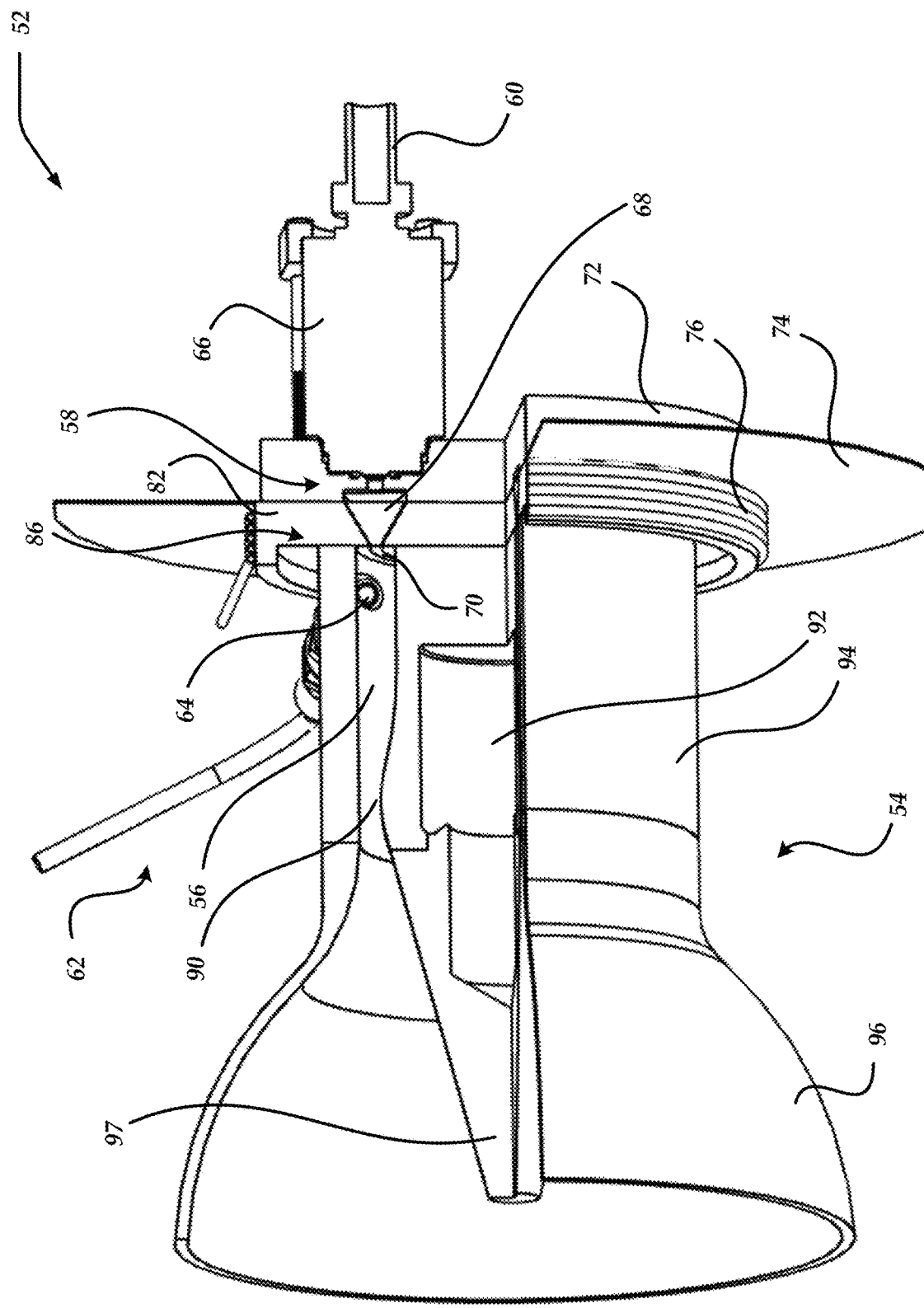
FIG. 7 is an isometric quarter-sectional, side-elevational view of the monopropellant continuous detonation engine of FIG. 6.

As shown in FIG. 6, the monopropellant continuous detonation engine ("MCDE") 52 has an engine body 54 that defines a rotating detonation annulus or channel 56, a monopropellant feed assembly 58 that is configured to deliver monopropellant from a fuel supply tube 60 to the channel 56, and a pre-detonator assembly 62 that is configured to initiate continuous detonation of the monopropellant in the channel 56 by azimuthally injecting a donor detonation wave through a detonation tube 64 into the channel 56 (see FIG. 7). Pre-detonation or initial ignition is achieved through the various methods disclosed in U.S. application Ser. No. 17/343,679. The monopropellant feed assembly 58 includes a propellant valve 66 that selectively controls the flow of monopropellant into the channel 56, a plenum 68 defined by a backplate or back body 72 that receives the monopropellant from the valve 66 and distributes the monopropellant along an injection region 70, and an injector plate or body 82 that injects the monopropellant from the plenum 68 into the injection region 70 in the channel 56. The size of the plenum 68 may be selected based on the application. In general, the plenum 68 should be large enough (width as measured orthogonal to the central axis of the engine 52 that extends parallel to the direction of thrust and depth as measured parallel to the central axis of the engine 52) to evenly distribute monopropellant around the annulus 56 but small enough to limit the dribble volume (i.e., the volume of propellant that drains out of the plenum 68 after the valve 66 closes) to prevent extended duration of detonation after closing the valve 66. The monopropellant feed assembly 58 is configured to prevent upstream travel of detonation waves through the injector body 82, including preventing upstream travel of each of the combustion waves and shock waves, from the channel 56 to the fuel supply tube 60 and also to prevent upstream conduction of thermal energy from the channel 56 under continuous-detonation conditions and after shutdown (i.e., soak-back) that could otherwise detonate or ignite monopropellant in the plenum 68 or upstream of the plenum 68. Accordingly, the MCDE 52 provides the advantages of both conventional monopropellant rocket engines and continuous detonation engines while successfully preventing flashback during continuous detonation.

Figure 8:
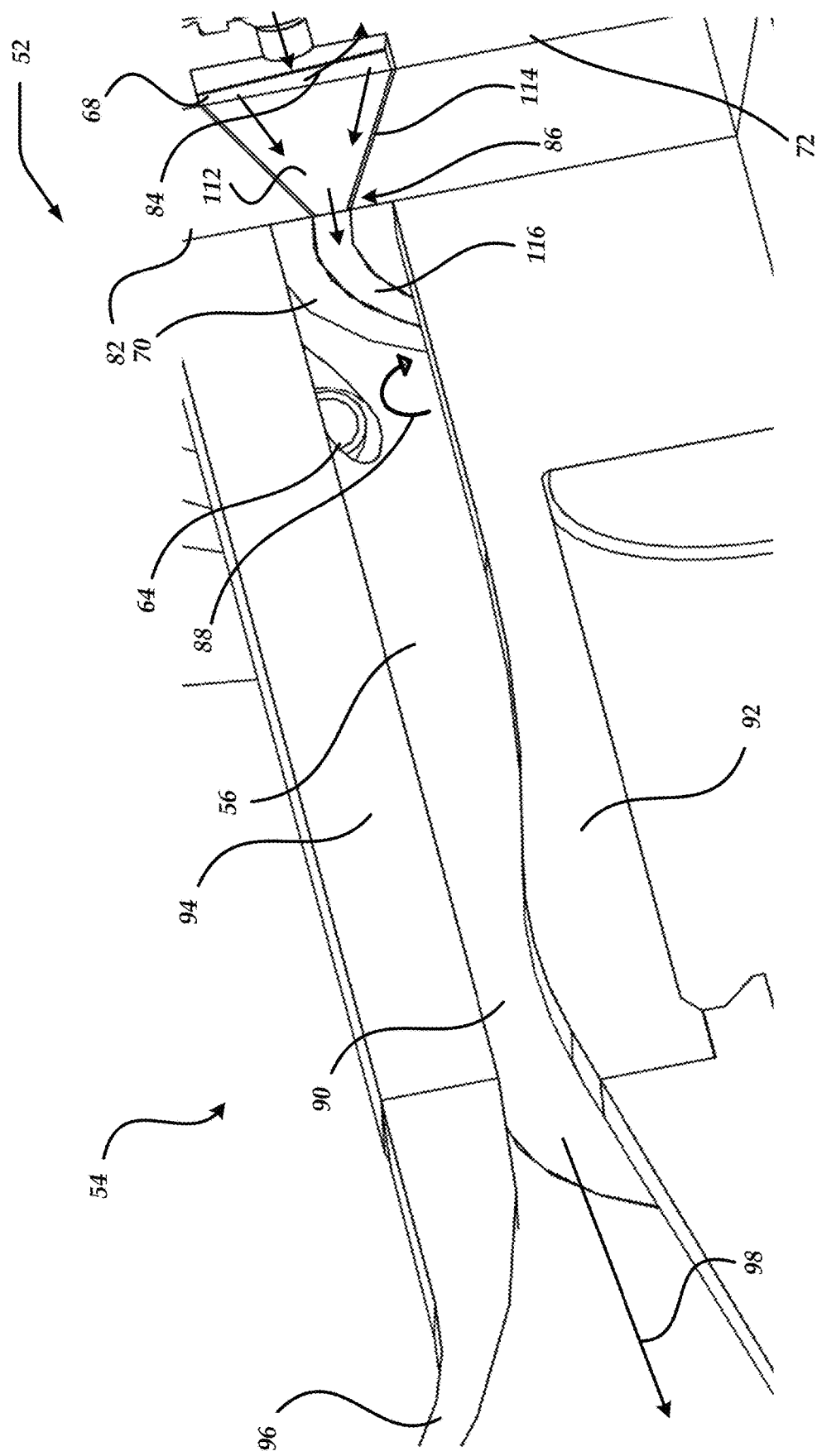
FIG. 8 is an isometric quarter-sectional view of a portion of the monopropellant continuous detonation engine of FIG. 6.

As represented by the arrow 84 in FIG. 8, the monopropellant circulates circumferentially through the plenum 68 and, when the monopropellant pressure in the plenum 68 is sufficient to overcome the downstream flow impedance, the monopropellant travels through the injector body 82, which is configured to inhibit upstream transmission of detonation waves or shock waves. When the pre-detonator assembly 62 injects a strong, donor detonation wave through the tube 64 into the channel 56, resulting detonation waves continuously propagate through the monopropellant in the circumferential channel 56, as indicated by the arrow 88. The tube 64 has an inner diameter that is larger (for example, an inner diameter of 0.25 inches) than the cell size for the pre-detonation propellant(s) injected into the tube 64 to support the strong, donor detonation wave. The pre-detonation propellant(s) are preferably highly detonable and therefore, in combination with the large cross-sectional area of the tube 64, provide a powerful pre-detonation wave as the strong, donor detonation wave, which facilitates detonating the monopropellant in the annulus 56. The reaction products travel downstream through the nozzle throat 90 defined by the center body 92 and the outer body 94 of the body 54 and exit through the exit shroud 96 of the body 54, as represented by the arrow 98 (the dual-surface shroud provided by the inner surface of the exit shroud 96 and the outer surface of the spike 97 of the center body 92 facilitates utilizing a shorter shroud than the nozzles of conventional rocket engines, but the spike 97 may be replaced with a conical frustum on the center body 92). The thermal mass of the injector body 82 is substantial and thus takes a fair amount of time to heat up during a firing.

In some embodiments, an injector heater 76 heats the monopropellant during injection until the injector body 82 reaches a predetermined temperature threshold to promote transitioning the monopropellant to the vapor phase before injecting the pre-detonation donor detonation wave. In some embodiments, responsive to the heat released from the rotating detonations producing enough heat to vaporize injected monopropellant without use of the heater 76, the heater 76 is turned off. Unlike conventional monopropellant thrusters that utilize a catalyst heater to heat a catalyst to a temperature at which the catalyst catalyzes or promotes decomposition of the monopropellant to enable ignition, the injector heater 76 does not decompose the monopropellant and instead merely promotes at least partial vaporization, thereby placing the monopropellant into a more detonable state. Accordingly, unlike the conventional monopropellant thrusters that cannot re-initiate ignition if the catalyst heater fails (i.e., the catalyst heater is a common failure point in all conditions), the MCDE 52 may still re-initiate detonation if the injector heater 76 fails because some vaporization should still take place without the heater 76 in most conditions (i.e., the heater 76 is not a failure point in most conditions). For example, injecting the monopropellant into the chamber 56 while the MCDE 52 is in outer space results in exhausting into a vacuum, which provides a strong impetus to vaporize, even at a low temperature. In some embodiments with the nozzle throat 90 that reduces the volume of the detonation chamber 56, the injection of the monopropellant is pulsed when re-initiating detonation if the heater 76 is omitted or fails to inject less monopropellant at the time of initial detonation to take advantage of the vacuum effect that promotes vaporization. Accordingly, constant-volume decomposition of the monopropellant is thus initiated and sustained without the use of a catalyst. The absence of a catalyst bed also means that the reaction kinetics are changed from those of conventional monopropellant thrusters and therefore facilitates providing higher performance for the reasons explained herein with respect to continuous detonation engines. Moreover, the MCDE 52 facilitates significantly increased reliability than conventional monopropellant thrusters by eliminating the failure point of the catalyst bed required in conventional monopropellant thrusters.

The inventor of the present application recognized that initiation of detonation waves in conventional monopropellants (for example, hydrazine) in the vapor phase is possible in spaces larger than the detonation cell size for the monopropellant. A reliable method for initiating such detonations is using a strong pre-detonation donor detonation wave injected tangentially into the annulus 56, as discussed above. In some embodiments, a simple spark is utilized to initiate detonation in the annulus 56, thereby eliminating the use of separate reactants to drive the donor wave. Experiments that led to the belief that conventional monopropellants (e.g., hydrazine, HAN, AF-M315E, LMP-103S) are very difficult to detonate failed to evaluate impacting such monopropellants with a detonation wave traveling through an opening much larger than the detonation cell size of the monopropellant. By injecting conventional monopropellant into the injection region 70 and using the pre-detonator assembly 62 to impact the conventional monopropellant with a detonation wave, the conventional monopropellant (previously believed to be undetonable) fuels continuous detonation waves in the channel 56. The low detonability of such conventional monopropellants facilitates using simple mechanisms to prevent detonation upstream from the injection region 70, such as the insert 112 discussed below or the small pores discussed further below. In particular, stable detonation of the monopropellants is established in the relatively large detonation zone of the channel 56, but upstream propagation of detonation waves through the injection ports is inhibited because the travel paths through such injection ports are much smaller than the detonation cell size required for such detonations to propagate. Accordingly, the invention of the present application facilitates safe continuous detonation with monopropellants previously believed to be unusable with continuous detonation engines.

After startup and during steady-state operation, incoming monopropellant from the plenum 68 facilitates cooling the injector body 82 by transferring heat from the injector body 82 to the incoming liquid propellant. Vaporization of the incoming liquid propellant before or as it is injected into the channel 56 also cools the injector body 82. In some embodiments, the monopropellant feed assembly 58 is configured to vaporize the monopropellant during steady-state flow rates at or very near the downstream exit from the injector body 82, thereby facilitating such evaporative cooling. In embodiments utilizing propellants more susceptible to detonation or thermal ignition, a radiator fin 74 is thermally coupled to the injector plate 82 (for example, mechanically coupled with thermally conductive bonding) to draw away thermal energy from the injector plate 82 and radiate such energy to space. The combination of radiation cooling via the radiator fin and sensible and evaporation cooling by the incoming propellant facilitates preventing thermally induced flashback during a firing.

The continuous-detonation injector body 82 is configured to prevent upstream travel of not only deflagrative combustion and detonation waves but also shock waves, as well as upstream conduction of thermal energy from the channel 56 under continuous-detonation conditions that may otherwise detonate monopropellant in the plenum 68 or upstream of the plenum 68. The continuous-detonation barrier 86 is also configured to dissipate thermal energy (for example, by way of cooling by the monopropellant and radiative cooling through the radiator fin 74) from continuous detonation and upstream detonation waves, combustion waves, or shock waves that could otherwise ignite monopropellant upstream of the plenum 68. The injector body 82 is cooled by the incoming propellant flow and, in some embodiments, by the radiator fin 74 that facilitates radiating thermal energy to space. In some embodiments, the high thermal mass of the injector body 82 serves as a heat sink for short firings. Accordingly, the continuous-detonation barrier 86 facilitates utilizing monopropellant in the MCDE 52 without flashback during continuous detonation.

Figure 9:
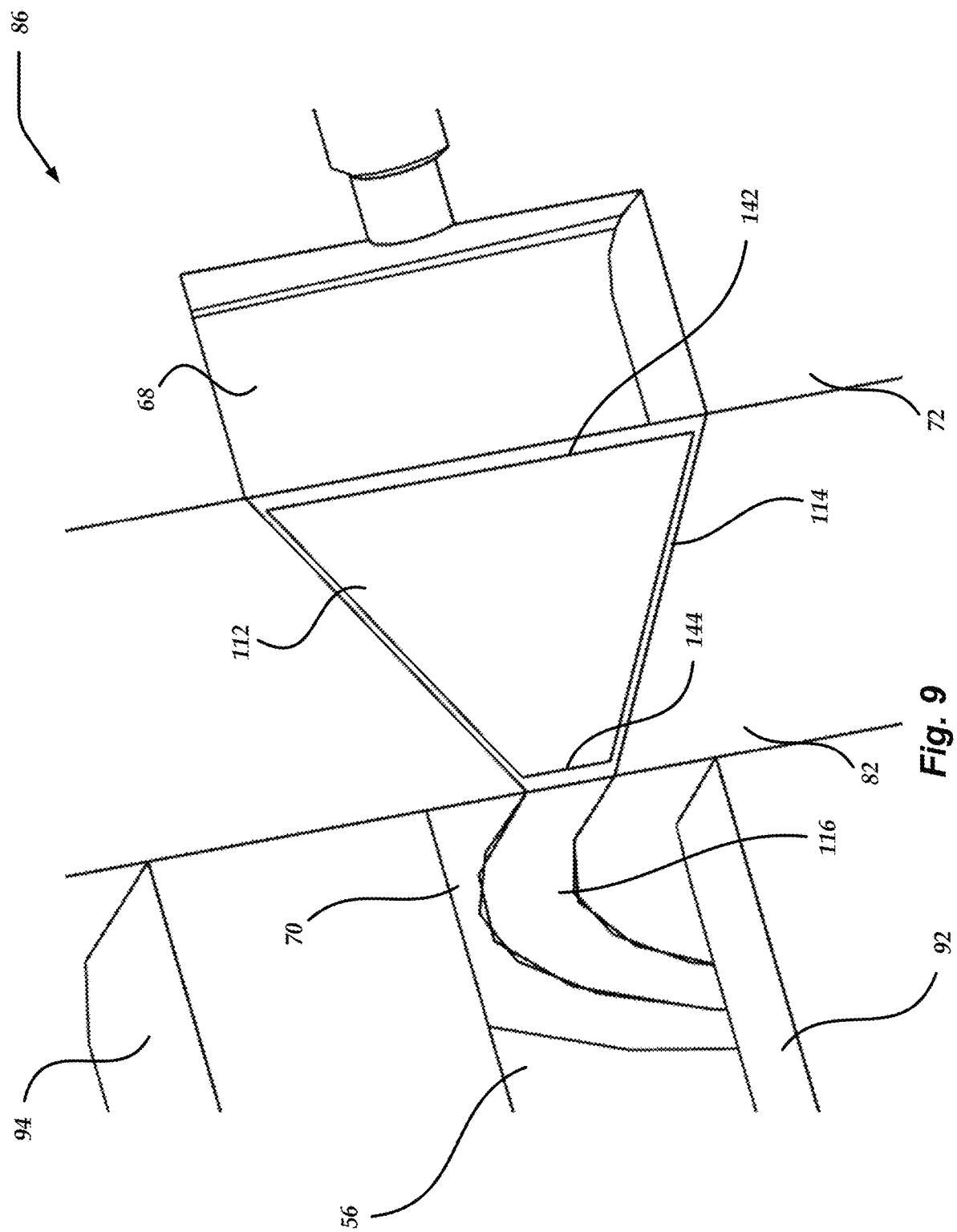
FIG. 9 is an isometric cross-sectional view of a portion of the monopropellant continuous detonation engine of FIG. 6.

As shown in FIG. 9, the continuous-detonation barrier 86 includes a continuous-detonation barrier insert 112 disposed in an opening 114 defined by the injector body 82. Like the plenum 68, the insert 112 and the opening 114 are circular and extend along the entire circumference of the channel 56 (see FIG. 6). The continuous-detonation barrier insert 112 of FIG. 9 is porous to facilitate downstream travel of monopropellant and to prevent upstream travel of each of combustion waves and shock waves during continuous detonation in the channel 56. The extension of the insert 112 along the entire circumferential length of the channel 56, however, provides the insert 112 with a large cross-sectional area (as measured in a plane to which the thrust direction or central axis of the channel 56 is normal) compared to the single feed tube into the combustion chamber in typical monopropellant thrusters that have catalyst beds. Accordingly, the insert 112 facilitates use of lower permeability material than can be used in conventional monopropellant injectors, barriers, or arrestors while providing adequate mass flow rate to sustain continuous detonation and to meet engine-thrust requirements.

Moreover, the continuous-detonation barrier 86 provides a cross-sectional area (as measured in a plane to which the thrust direction or central axis of the channel 56 is normal) in the MCDE 52 that is significantly larger than the total cross-sectional area of all injector ports in an equivalently sized bipropellant rotating continuous detonation rocket engine. This increase in injector area permits the insert 112 to have significantly smaller and more tortuous internal paths used with typical feed pressures. To promote mixing in a typical bipropellant rotating continuous detonation rocket engine with an annular diameter of 3 inches, the fuel and the oxidizer may each be injected through 72 pairs of injector ports, each with a diameter of 0.01-0.015 inches, for a cumulative injector port area of 0.025 square inches, but a similarly dimensioned version of the MCDE 52 has a cross-sectional area of the insert 112 of approximately 1 square inch, which is approximately 40 times greater than the example bipropellant injector area. The difference is significant with respect to the object of inhibiting flashback in a monopropellant continuous detonation engine. The current Aerojet Rocketdyne MR-106L 22N thruster, which uses a catalyst bed to promote hydrazine decomposition by deflagration, is designed to deliver a nominal 5.0 lbf of thrust, with a flow rate varying from 0.31-0.009 lbm/sec, feed pressures varying from 400-85 psia, and chamber pressures varying from 195-56 psia, for a pressure drop through the engine of 205-29 psia. The MCDE 52 with a 3-inch center diameter, an annular channel width of 5 mm, and a porous injector insert with a permeability of 0.1 Darcy (1 E-13 $m^2$) and thickness of 0.1 inch facilitates delivering the required flow rates over the range of nominal feed pressures with expected detonation zone average pressures of 40-100 psia. A stainless-steel porous metal injector, made from readily available porous material, with a permeability of 0.1 Darcy has, according to the present invention, an average pore diameter of approximately 2.5 μm, which is small enough to prohibit each of combustion waves and shock waves from propagating upstream through vapor or liquid into the fuel supply tube 60.

The porous passages within the low-permeability insert 112 have tortuous paths and diameters of less than 2,500 microns, less than 1,250 microns, less than 625 microns, less than 310 microns, or less than 155 microns, depending on the state of the monopropellant (i.e., vapor or liquid), energy density of the monopropellant, and the detonation cell size of the monopropellant. The axial thickness of the insert 112 should be selected at increasingly larger dimensions as greater permeability is selected for the insert 112 to compensate for the loss in combustion-wave and shock-wave suppression provided by the permeability of the insert 112. The permeability of the insert material depends on the porosity of the insert material, the pore diameters, and the tortuosity of the passages. Although references discussed in the Background of the Invention have shown that single combustion waves may be quenched with the complex barriers taught by those references (or made allegations regarding shock waves based on flawed theoretical analysis), the inventor of the present invention discovered that the insert 112 also prevents each of combustion waves and shock waves from traveling upstream beyond the insert 112 with the use of the porous material during continuous detonation without the need for a separate wave deflector, contrary to the teachings of the references in the Background of the Invention.

The opening 114 and, in some embodiments, also the insert 112 extend from the plenum 68 to an injector exit 116 in the injection region 70 in the channel 56. In some embodiments, the monopropellant is injected into the annulus as atomized liquid droplets, but in some embodiments, the monopropellant is vaporized at the injection-region surface of the insert 112 to facilitate injecting the monopropellant as a vapor. In other embodiments, the monopropellant transitions from liquid to gas within the insert as the monopropellant moves toward the injection-region surface of the insert 112. The point of such transition may vary as the engine heats up. The insert 112 is configured to prevent detonation waves from traveling upstream through either vapor phase or liquid phase monopropellant.

In some embodiments, the propellant valve 66 is stood off from the back plate 72 (contrary to the embodiment shown in FIG. 6) to further impede thermal transfer upstream through the feed tube into the valve 66. In some embodiments, a radiator fin (not shown) is thermally coupled to the feed tube between the valve 66 and the plenum 68 (for example, a second radiator fin similar to and in addition to or in alternative to the fin 74).

Figure 10B:
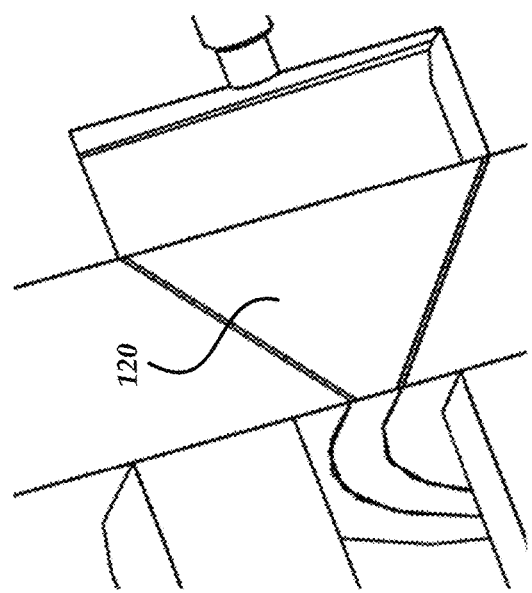
FIG. 10B is an isometric cross-sectional view of a portion of a third embodiment of a monopropellant continuous detonation engine in accordance with the principles of the invention.
Figure 10D:
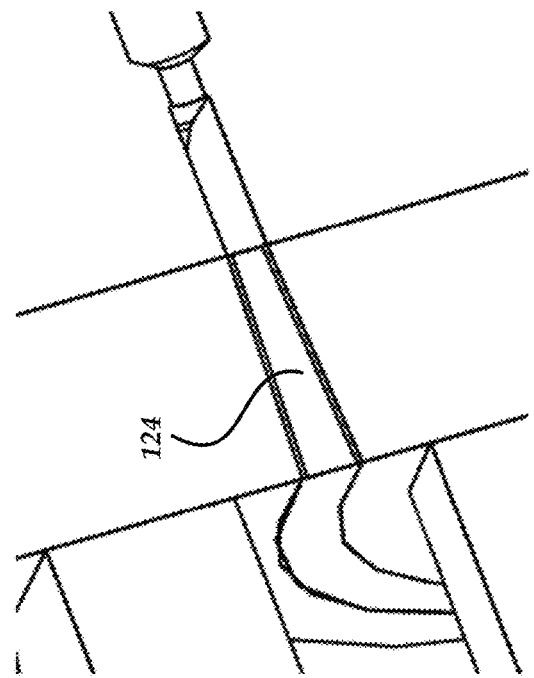
FIG. 10D is an isometric cross-sectional view of a portion of a fifth embodiment of a monopropellant continuous detonation engine in accordance with the principles of the invention.
Figure 10A:
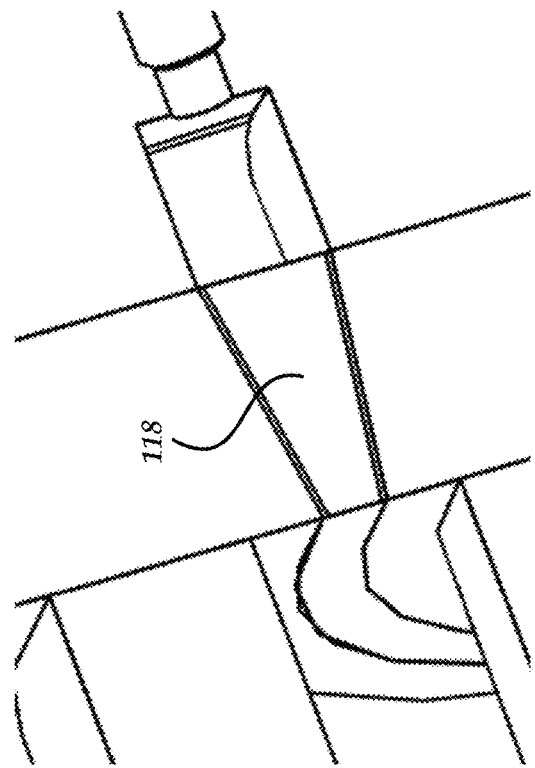
FIG. 10A is an isometric cross-sectional view of a portion of a second embodiment of a monopropellant continuous detonation engine in accordance with the principles of the invention.
Figure 10C:
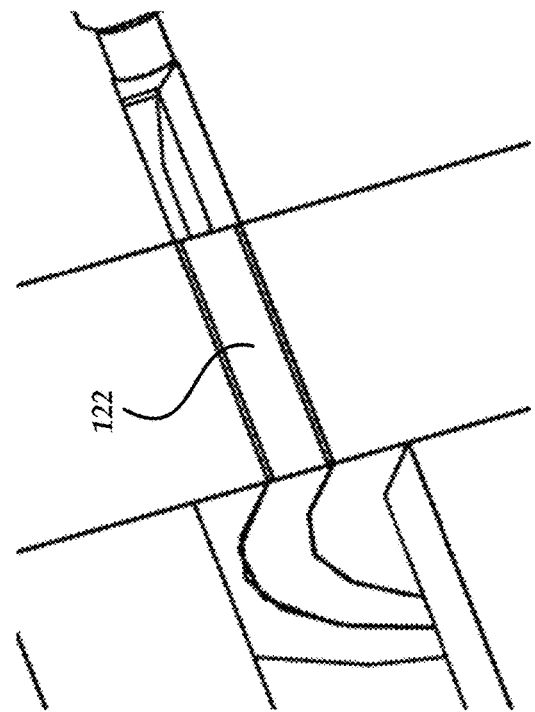
FIG. 10C is an isometric cross-sectional view of a portion of a fourth embodiment of a monopropellant continuous detonation engine in accordance with the principles of the invention.

As shown in FIGS. 10A-10D, continuous-detonation barrier inserts of the present invention and the openings that receive the inserts may have various shapes. These differently shaped inserts provide different flow rates and thus may be selected based on the desired flow rate, feed pressure, annulus or channel diameter and width, or the method for bonding the insert to the injector body. As shown in FIG. 10A, the continuous-detonation barrier insert 118 has a narrower taper than the insert 112, which facilitates maintaining the monopropellant in the liquid phase for its passage through the insert 118 or which may be useful with a thinner annular width. As shown in FIG. 10B, the continuous-detonation barrier insert 120 has a wider taper than the insert 112, which facilitates vaporization of a less volatile monopropellant as it moves through the insert 120 and the pressure decreases, and the insert 120 presents a larger average cross-sectional area, thereby reducing the required pressure drop through the insert 120 for the same mass flow rate. As shown in FIG. 10C, the continuous-detonation barrier insert 122 has no taper, which facilitates maintaining the liquid state of the monopropellant through most of or all of its passage through the insert 122, and enables integration with a smaller plenum width or a smaller annular width. As shown in FIG. 10D, the continuous-detonation barrier insert 124 has a reverse taper compared to the insert 112, which facilitates injecting the monopropellant into the detonation zone 70 as a liquid.

Figure 11:
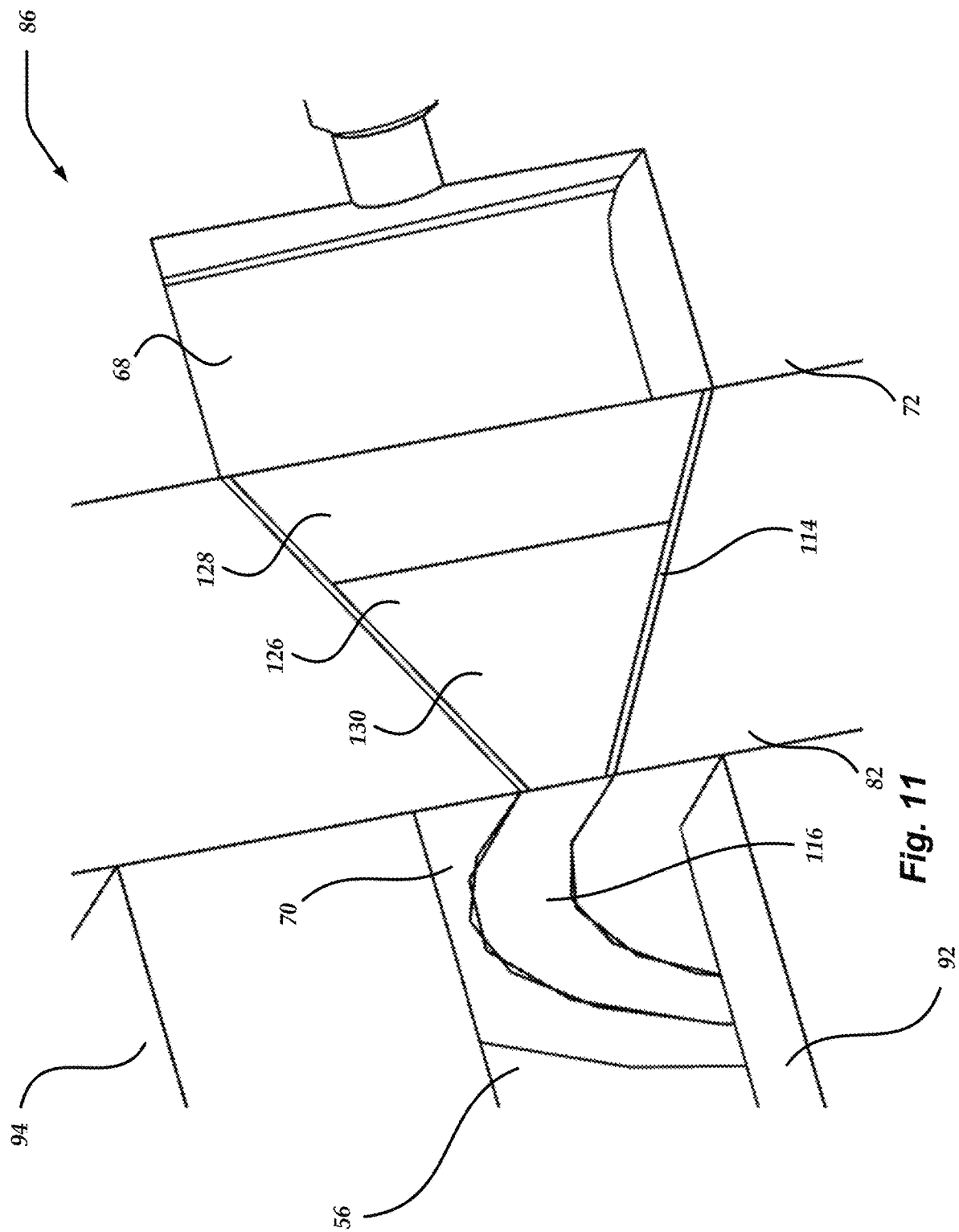
FIG. 11 is an isometric cross-sectional view of a portion of a sixth embodiment of a monopropellant continuous detonation engine in accordance with the principles of the invention.

The inserts 112 and 118-124 are each schematically represented as having a single porosity throughout the insert. As shown in FIG. 11, however, a continuous-detonation barrier insert 126 having two or more layers of different porosity may be used in the continuous-detonation barrier 86. The insert 126 is generally the same as the insert 112, except the insert 126 has an upstream layer 128 and a downstream layer 130 that has different porosity than the upstream layer 128. In other embodiments, separate inserts having different porosity may be stacked on each other to achieve similar results. The insert 126 is shown as having the same shape as the insert 112 but may have the same shape as any of inserts 118-124. In some embodiments, one of the layers 128, 130 includes material that is catalytic to partial decomposition (i.e., incomplete decomposition) of one component in a pre-mixed bipropellant such as AF-315E into components that are more detonable than pure AF-M315E but not fully decomposed as they would be in a conventional catalytic engine. This approach facilitates using monopropellants that, without any decomposition, would not detonate responsive to a donor wave and also makes detonating other monopropellants such as AF-M315E much more reliable.

Although the schematic representations in FIGS. 9-11 show, for ease of understanding the invention, the inserts 112 and 118-126 spaced apart from the surfaces that define the openings in which the inserts are disposed, the inserts are bonded to the injector body 82 on both the large-circumference side of the insert and the small-circumference side of the insert to prevent fluid flow through the interface between the insert and the injector body 82. Acceptable bonding includes brazing or another high-temperature sintering method utilizing braze materials that are known to be compatible with the selected monopropellants, such as hydrazine or HAN monopropellants. Accordingly, the monopropellant that flows from the plenum 68 and out the injector exit into the channel 56 flows exclusively through the continuous-detonation barrier insert.

In some embodiments, the material of the porous inserts 112 and 118-126 are non-catalytic to monopropellant decomposition. In some embodiments, the inserts are ceramic due to ceramic's high-temperature capability and non-catalytic behavior with most monopropellants. High-temperature ceramic materials that can be manufactured to the shape of the insert 112 with the porosity of the present invention include silicon nitride ($Si_3N_4$), silicon carbide (SiC), alumina ($Al_2O_3$), and others. In other embodiments, the inserts are metallic. Suitable materials include stainless steel and its alloys, Inconel, Monel, Hastelloy, nickel and its alloys, or niobium.

It was previously believed that manufacturing small fluid paths with typical manufacturing methods was incapable of or uneconomical for producing a viable propellant injector head that acts as a flame barrier due to small quenching distances that were previously believed to be required, as explained in U.S. Pat. No. 8,572,946 issued to Mungas et al. (see lines 54-58 of column 11). The inventor of the present application, however, discovered that additive manufacturing is both capable and economical for manufacturing the inserts 112 and 118-126 with highly tortuous, small-diameter fluid paths in the porous solids. In particular, the large cross-sectional areas of such inserts in MCDEs make them more tolerant of the inevitable variations in small passage diameters and bore smoothness, as well as tortuosity, that are inherent in current additive machining capability, but such large cross-sectional area is not available in the injectors, barriers, or arrestors for conventional rocket engines such as those discussed in the Background of the Invention. The diameter and tortuosity of the interstitial passages and the permeability of the finished insert are selected according to the monopropellant, expected feed pressure, expected mass flow rate, and the liquid- or gas-phase detonabilities of the monopropellant.

The above descriptions of the inserts 112 and 118-126 relate to solid coherent inserts, but in some embodiments, inserts according to the present invention instead include small, tightly packed granular pieces of metal or a ceramic, such as alumina, held in place by porous metal screens on the upstream and downstream edges of the inserts, such as the upstream edge 142 and the downstream edge 144 of the insert 112 as shown in FIG. 9. The size distribution of the granules is selected to yield the desired permeability, pore size, and tortuosity.

Figure 1:
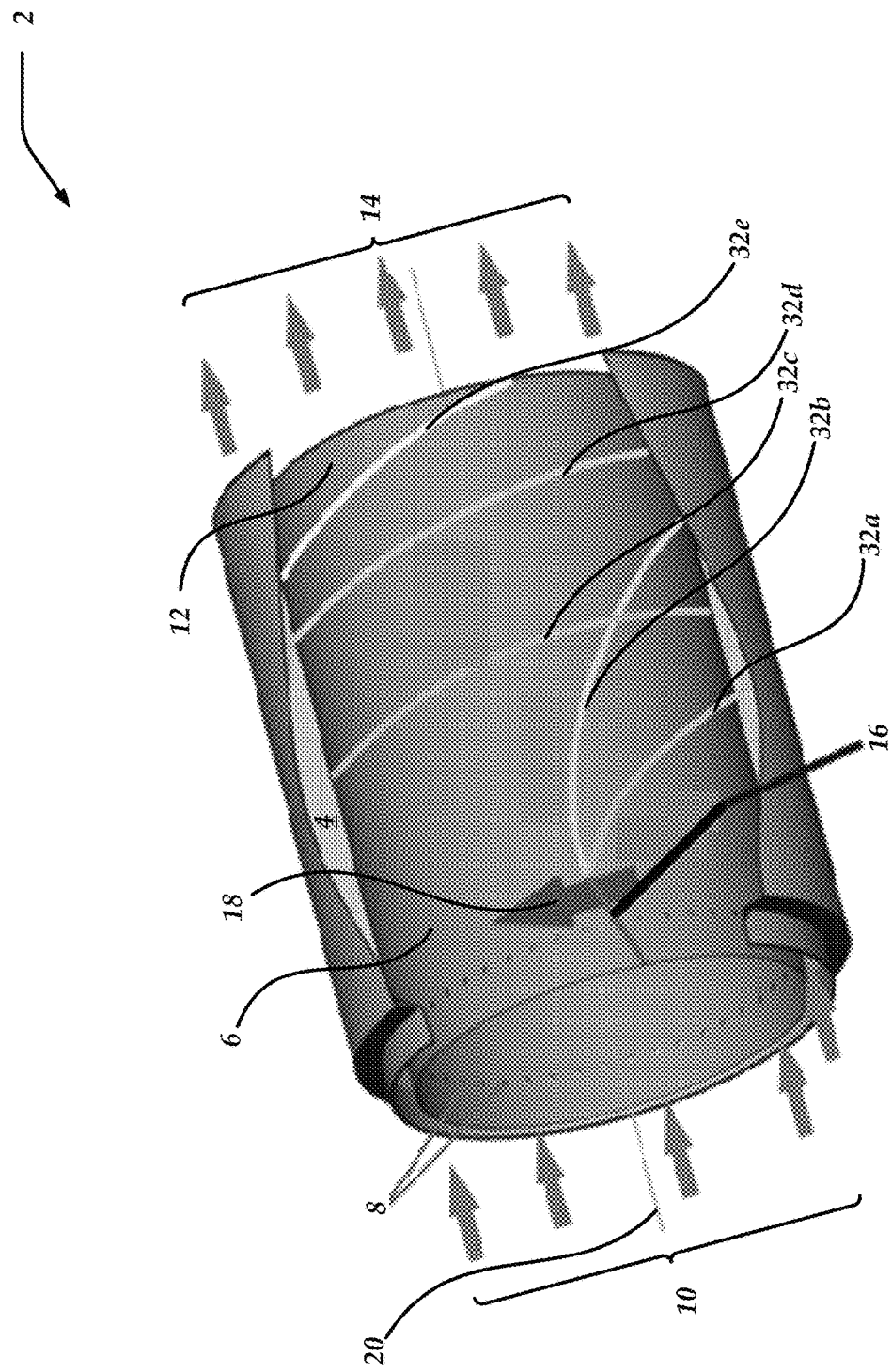
FIG. 1 is an isometric perspective view of a portion of a rotating detonation engine, having a portion thereof cutout to show the annulus.
Figure 2:
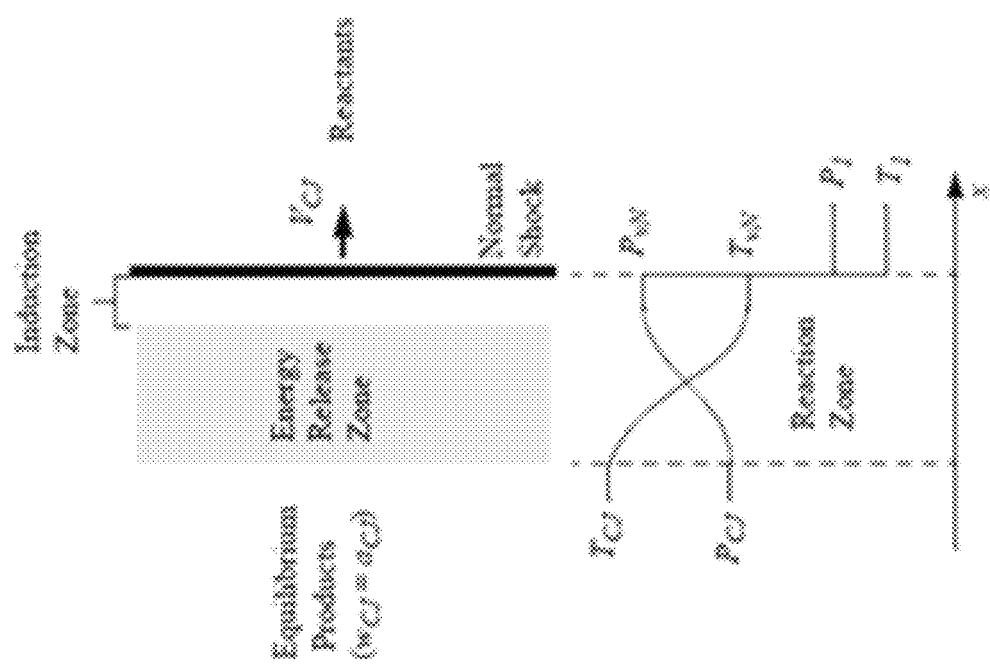
FIG. 2 is a schematic representation of an idealized ZND detonation model for a detonation wave traveling through a detonable mixture or medium.
Figure 3:
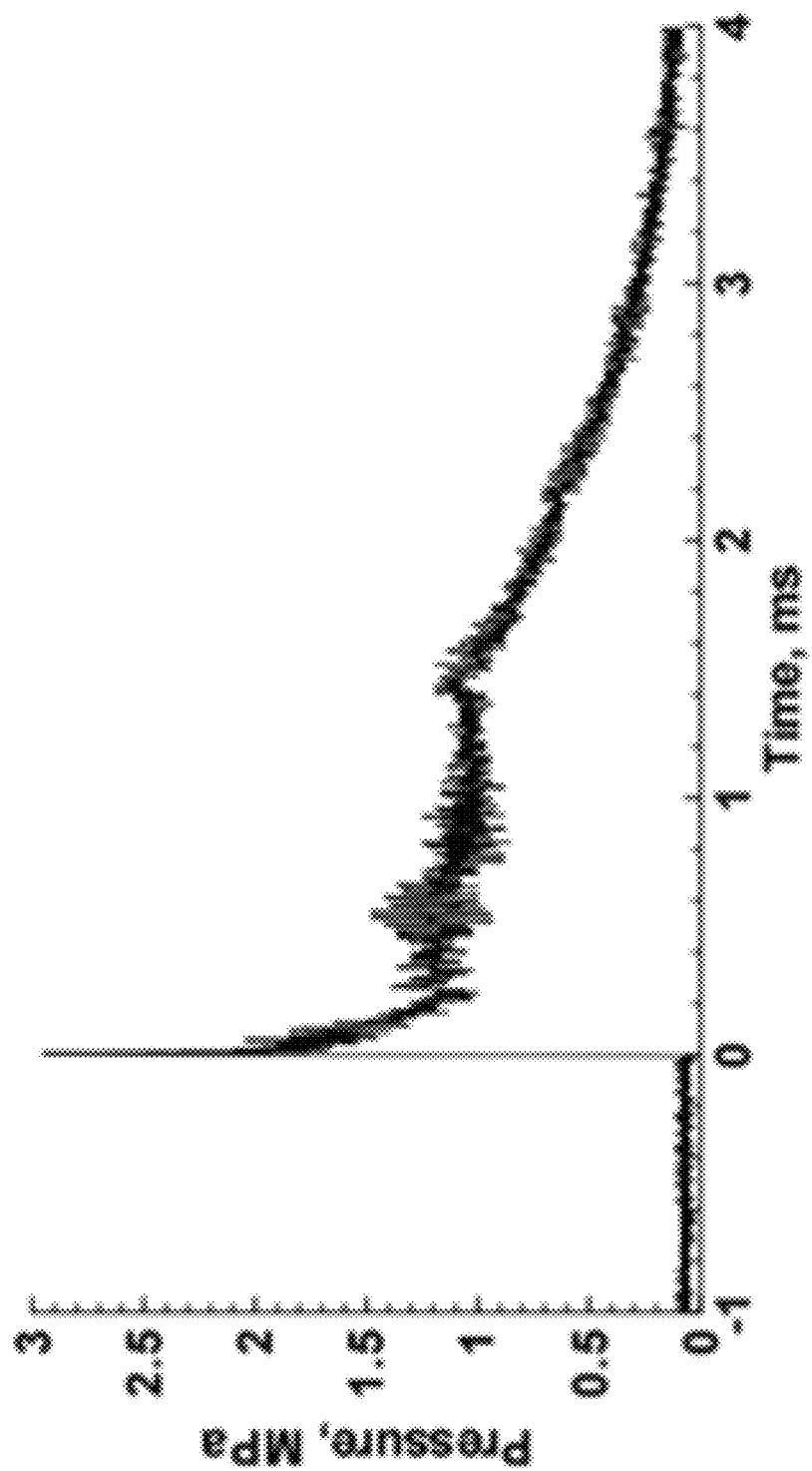
FIG. 3 is a plot graph showing pressure versus time for a typical detonation wave.
Figure 4:
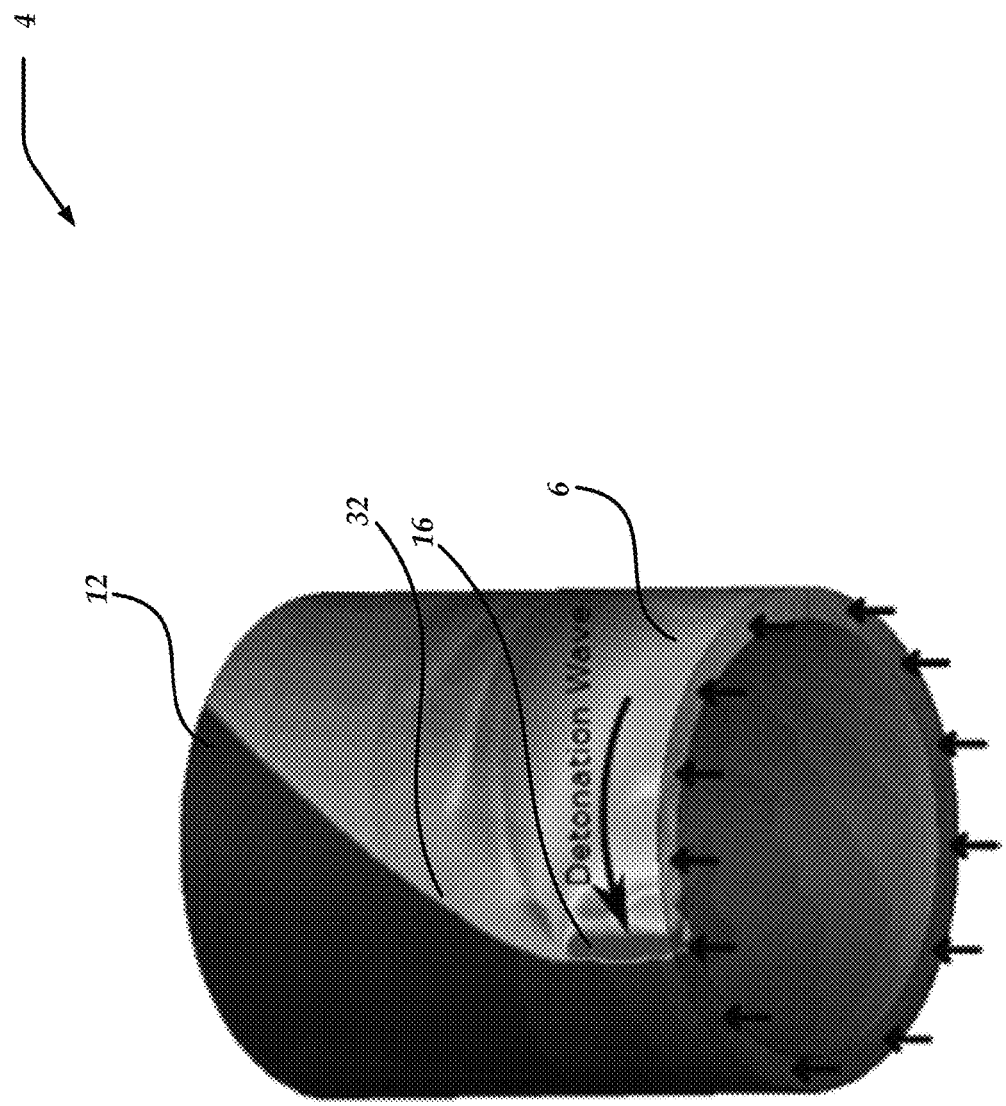
FIGS. 4 and 5 are schematic representations of pressure fields of computational fluid dynamics simulations of the RDE of FIG. 1.
Figure 5:
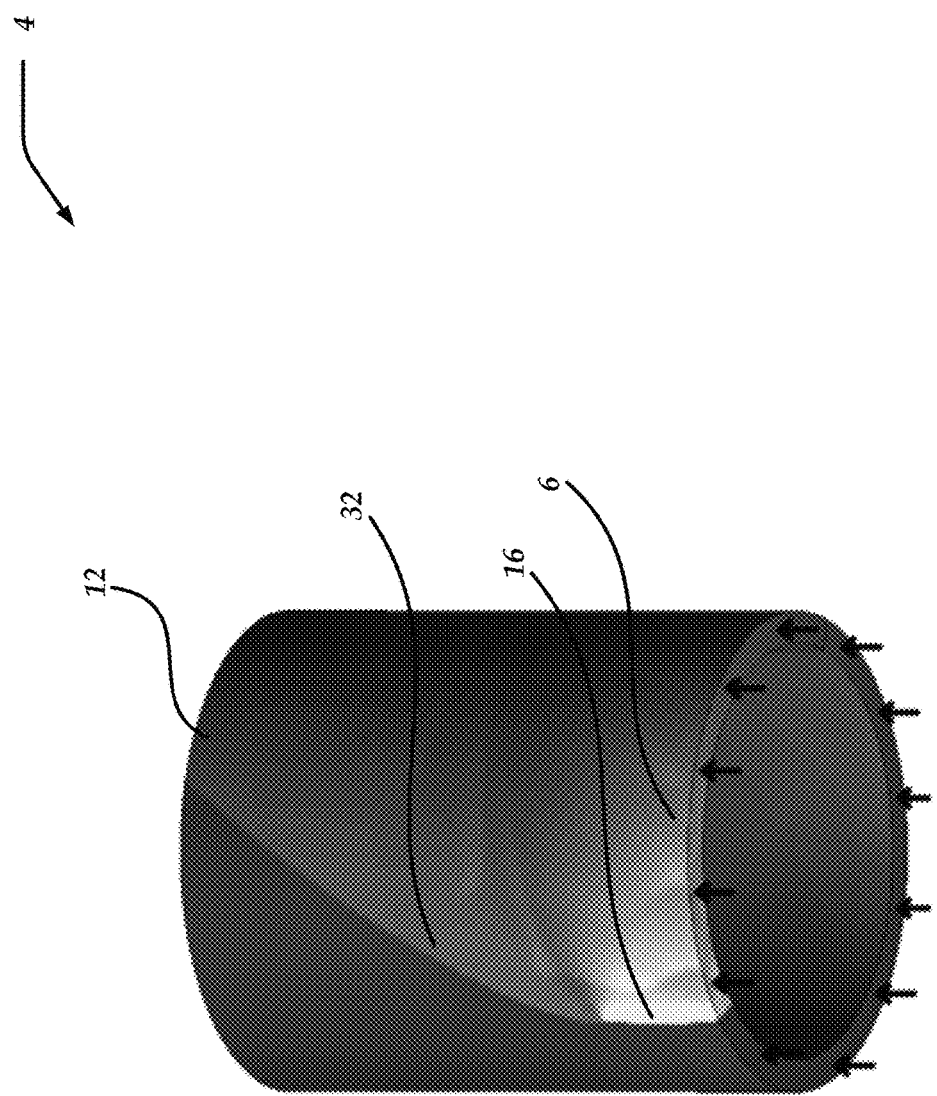
Figure 12:
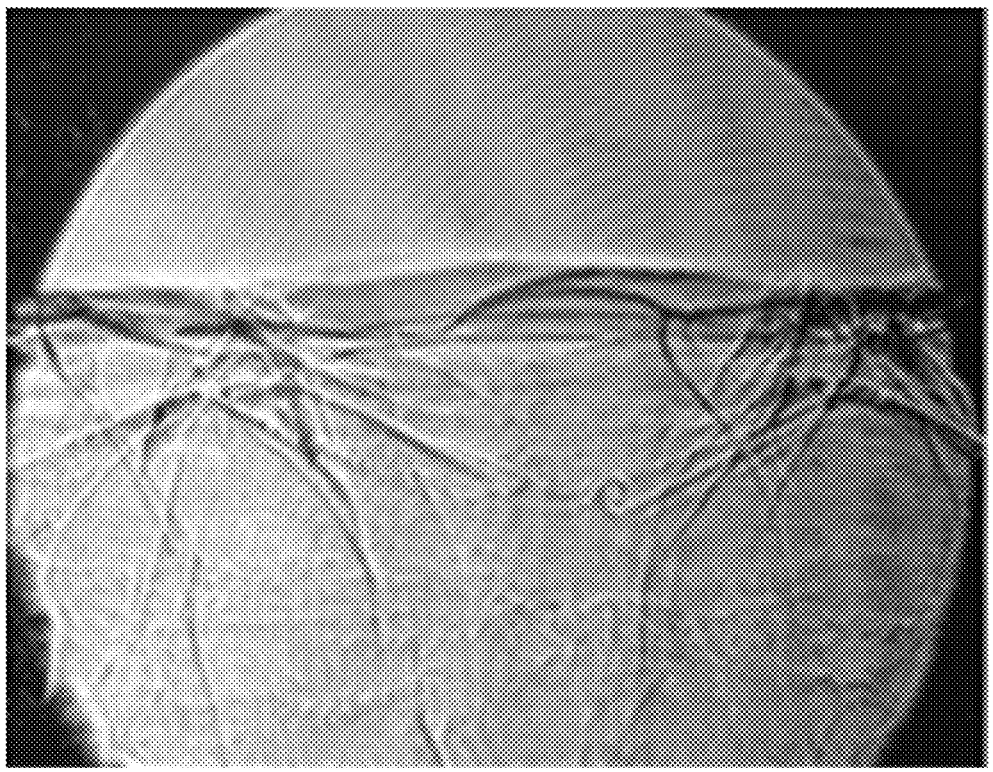
FIG. 12 is a schlieren image of a detonation wave in a $2H_2+O_2+Ar$ mixture at 20 kPa and 295K.
Figure 13:
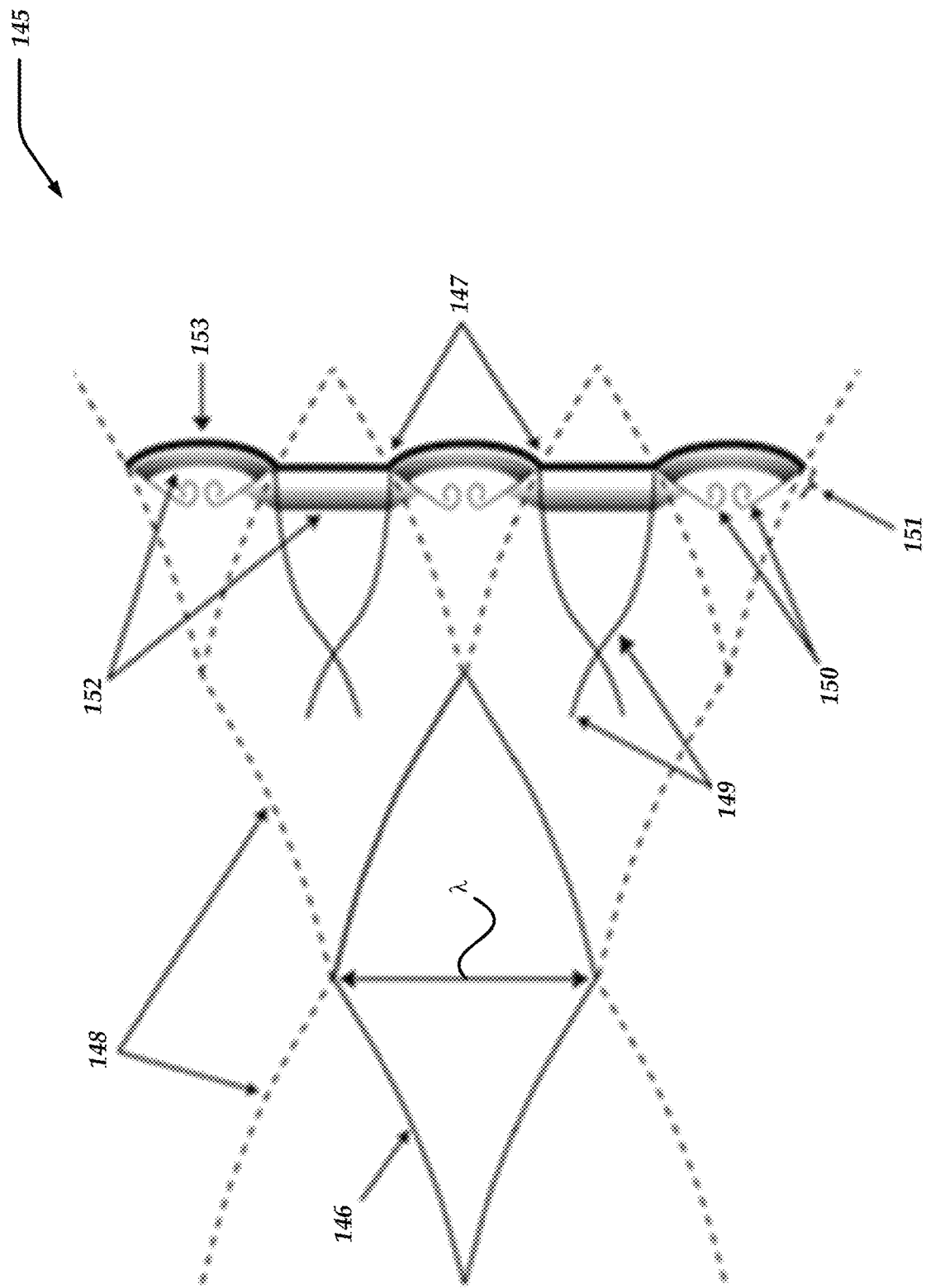
FIG. 13 is a schematic representation of the cellular structure of the detonation wave of FIG. 12.
Figure 14:
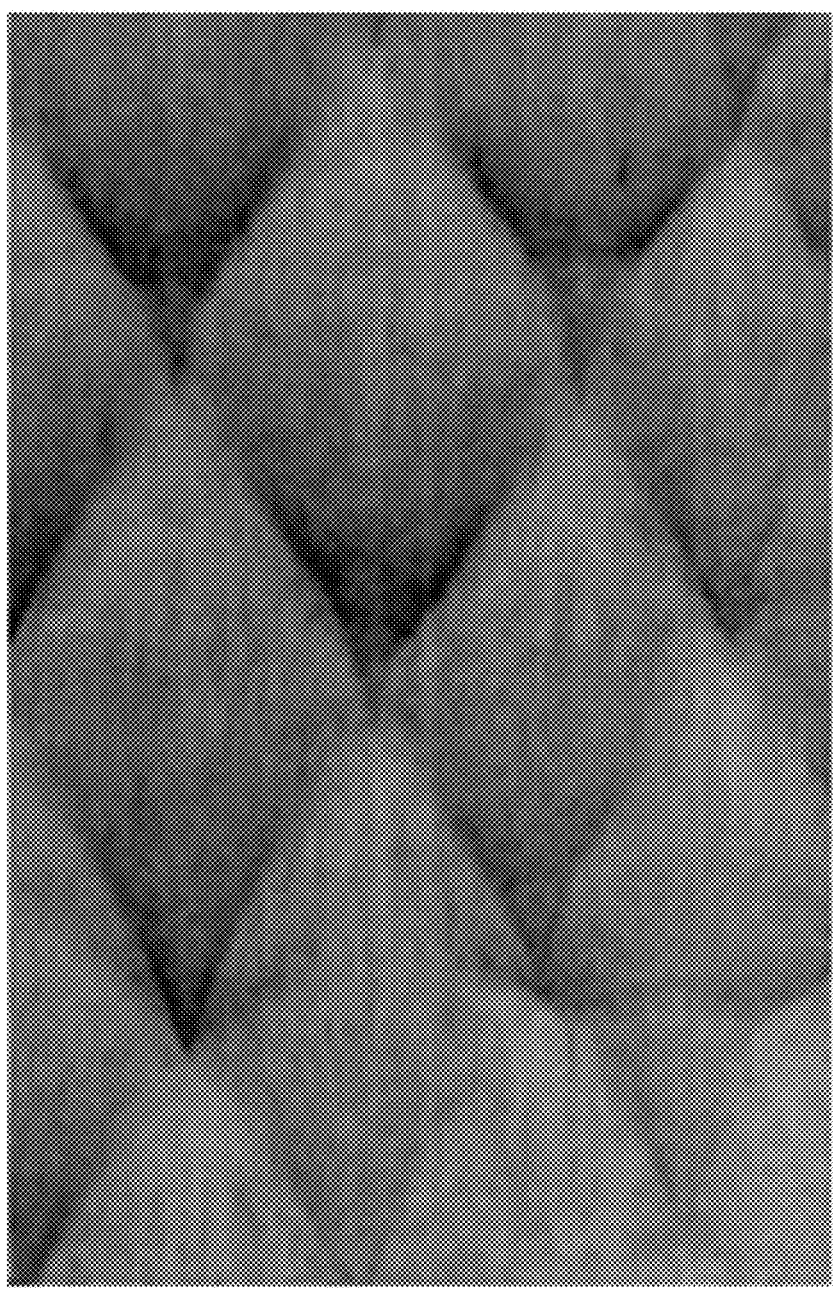
FIG. 14 is an image of the cellular structure of FIG. 13 imprinted on a sooted foil by the detonation wave of FIG. 12.

FIG. 12 shows a detonation wave 145 traveling from left to right in FIG. 12. In the energy release zone shown in FIG. 2, the exothermic reaction of the detonation wave 145 proceeds in cells such as the cell 146 defined by moving triple points 147 (see FIG. 13) that oscillate back and forth, reversing direction when they encounter other triple points in an adjoining cell. Also shown in FIG. 13 are triple point trajectories 148, transverse waves 149, shear layers 150, the detonation front 151, the reaction zone 152, and the leading shock wave 153. The cell size $\lambda$ is a function of the chemical components, ambient pressure, and temperature of the medium through which the wave 145 is moving. FIG. 14 shows a typical "fish scale" soot record 154 left by the detonation wave 145.

A volume of at least 1 or 2 times the cell size $\lambda$ is required for detonations to propagate. Porous barriers with pores smaller than the cell size $\lambda$ prevent detonation waves from propagating through the barrier, even if the pores in the barrier contain detonable chemical species that would support detonation in a larger space. Accordingly, the pores of the porous barriers discussed herein should have diameters that are less than the characteristic detonation cell $\lambda$ of the constituents flowing through such pores.

Moreover, microporous or microfluidic arrestors are not required to quench upstream detonation and prevent flashback because discrete ports that each have diameters less than the cell size $\lambda$ prevent detonation traveling through such ports. The length of such ports need not be longer than approximately 1 mm for conventional monopropellants. Further, the difficulty in detonating conventional monopropellants in the liquid phase enhances the ability of such ports to prevent upstream detonation because the monopropellant upstream of the ports (and often in the ports) is in the liquid phase. In contrast to the dimensions of the discrete ports, the dimensions of the annulus 56 through which the detonation wave travels are much larger than the detonation cell size $\lambda$, thereby facilitating continuous propagation of the detonation wave in the channel 56.

As explained in lines 60-61 of column 8 of the '946 Patent, the conventional wisdom is that the quenching distance for conventional monopropellants (for example, hydrazine) is around 1 mm. The present inventor, however, discovered that significantly shorter, conventionally machined ports with larger diameters than those emphasized in the '946 Patent successfully quench flashback in conventional monopropellants such as hydrazine. For example, a hole with no greater length than necessary to define the hole (for example, minimum material thickness of a sheet that defines the hole) and with a diameter smaller than the cell size $\lambda$ prevents upstream detonation. Accordingly, the prevention of upstream detonation is facilitated by ports that have a diameter smaller than the cell size $\lambda$ and lengths long enough to facilitate conventional machining techniques, such as a length to diameter ratio (L/D) of 10.

Figure 15:
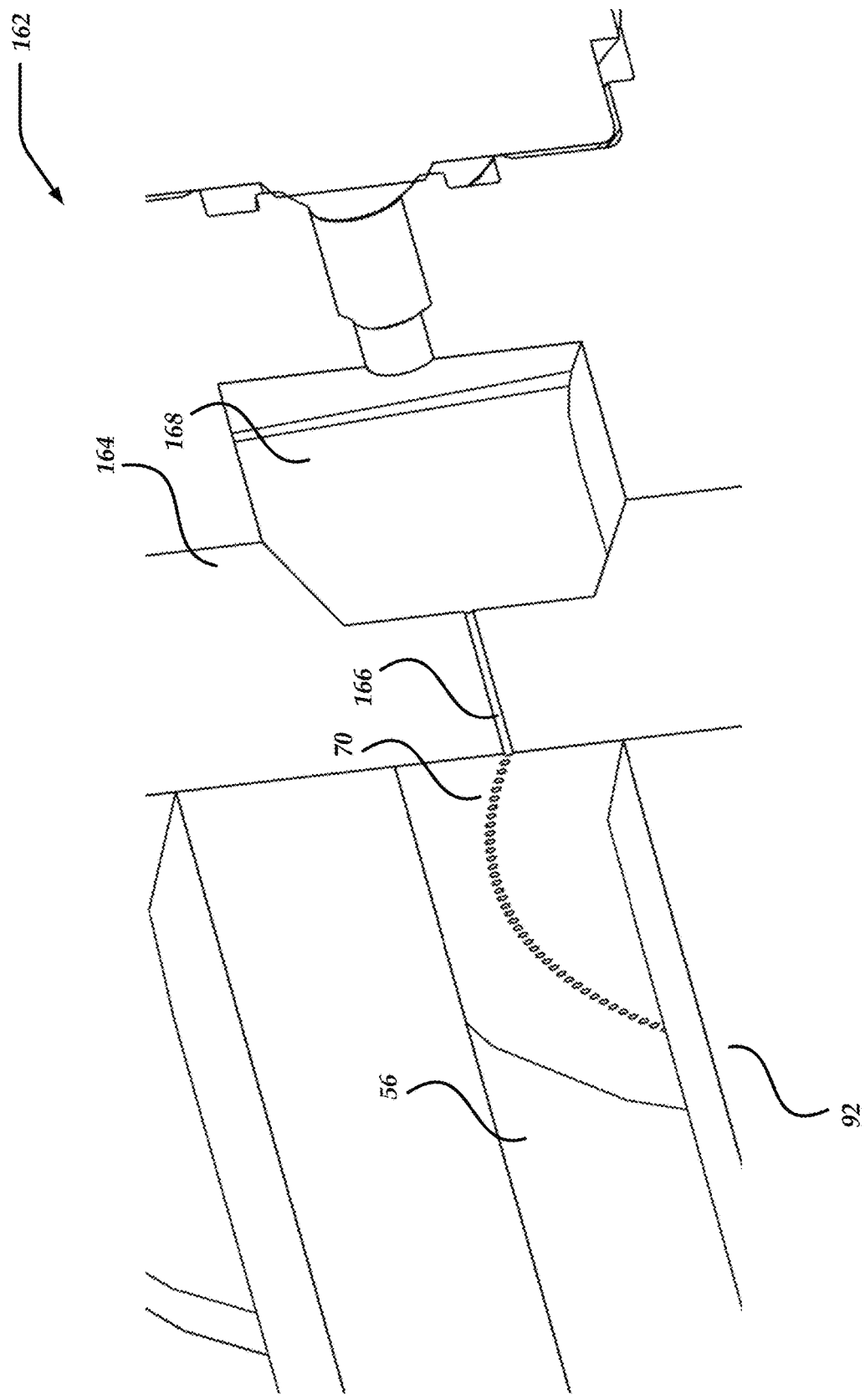
FIG. 15 is an isometric cross-sectional view of a portion of a seventh embodiment of a monopropellant continuous detonation engine in accordance with the principles of the invention.

FIG. 15 shows a portion of another embodiment of a monopropellant continuous detonation engine in accordance with the principles of the invention. The MCDE of FIG. 15 is substantially the same as the MCDE 52, except the continuous-detonation barrier 162 shown in FIG. 15 is different than the continuous-detonation barrier 86 of FIG. 9. The continuous-detonation barrier 162 includes an injector plate or body 164 that defines discrete, small-diameter injection ports, such as the injector port 166, that each separately fluidly couple the plenum 168 to the injection region 70 of the channel 56. The MCDE therefore directs monopropellant from the azimuthal plenum 168 through the injector ports to the detonation zone in the channel 56. The injection ports have sufficiently small diameters and sufficiently long lengths to dissipate and eventually suppress detonation waves that travel upstream in the injection ports, including shock waves traveling upstream in the injection ports, through either liquid-phase or vapor-phase monopropellant in the injection ports. For a given desired propellant throughput and feed pressure, smaller injector-port diameters can be selected as the selected number of injector ports increases. The detonation cell sizes for most monopropellants currently in commercial use are relatively large. The injection port diameters are less than the detonation cell size, and in some embodiments, the injection port lengths are at least ten times the port diameters. In other embodiments, the injection port lengths are less than ten times the port diameters. Accordingly, contrary to prior belief, such injection ports fabricated with conventional machining techniques to these dimensions (as described below) will readily suppress detonation waves for these monopropellants.

The inventor of the present invention discovered that, contrary to conventional wisdom, using conventional fabrication techniques to machine injection ports having diameters of 0.005-0.020 inches and lengths of at least 0.5-1 inches is sufficient to suppress and quench detonation waves including shock waves and thus permanently quench detonation waves traveling upstream in the injection ports in either vapor or liquid monopropellants currently in use by commercial suppliers of in-space thrusters, as discussed regarding the dimensions and examples above. In general, if smaller diameters are utilized, the number of ports can be increased to maintain the total cross-sectional area of all injection ports in the channel 56 in combination and thereby deliver the desired flow rate to the detonation zone with reasonable feed pressures (e.g., 50-400 psia). Such conventional fabrication techniques include conventional machining techniques such as drilling. Electrical-discharge (EDM) techniques or additive machining are also acceptable forms of forming the injection ports to facilitate permanent detonation-wave quenching. Although the injection ports of FIG. 15 are shown as straight and cylindrical, the injection ports have different shapes in other embodiments. In other embodiments, the ports have complex shapes with numerous turns and are manufactured using additive machining, using metallic materials.

The large total cross-sectional area of the porous injector insert or the large total cross-sectional area of all injector ports in combination facilitates both the porous injector inserts and the injection ports providing the required monopropellant mass flow rates to sustain continuous detonation while being configured to prevent propagation of detonation waves upstream into the plenum. Moreover, the large total cross-sectional area of either the porous injector insert or the numerous discrete injector ports in combination allows relatively lower mass flux (mass flow per unit area) for a given mass flow rate, thus requiring relatively lower feed pressures for a given thrust level compared to conventional catalytic deflagration engines. 144 discrete, straight ports, each with a diameter of approximately 0.014 inch and a length of approximately 0.75 inch, supports a flow rate of 0.31 lbm/s with a driving pressure drop across the ports of 200 psia. Straight ports with these diameters suppress detonation and shock waves in vapor phase monopropellants currently in use (e.g., hydrazine, AF-M315E, and LMP-103S), even without tortuous paths. Ports with these dimensions can be fabricated with readily available subtractive and additive machining technology. Moreover, tortuosity for further detonation-wave quenching can readily be built into injector ports of this size using known additive machining techniques.

The inventor of the present application discovered that hydrazine vapor readily detonates in sufficiently large spaces, so a sustained, azimuthal continuous detonation in the annular detonation zone of the channel 56 is not difficult to initiate using the teachings herein, even for partially vaporized (atomized) flows. Hydrazine liquid, however, is much more difficult to detonate. Thus, for either vapor phase, liquid phase, or mixed vapor/liquid phase of monopropellants currently in commercial use, the injector ports of the barrier 162 facilitate dissipating and eventually suppressing each of combustion waves and shock waves traveling upstream in the injector ports to permanently quench detonation waves traveling upstream in such injector ports.

Figure 16:
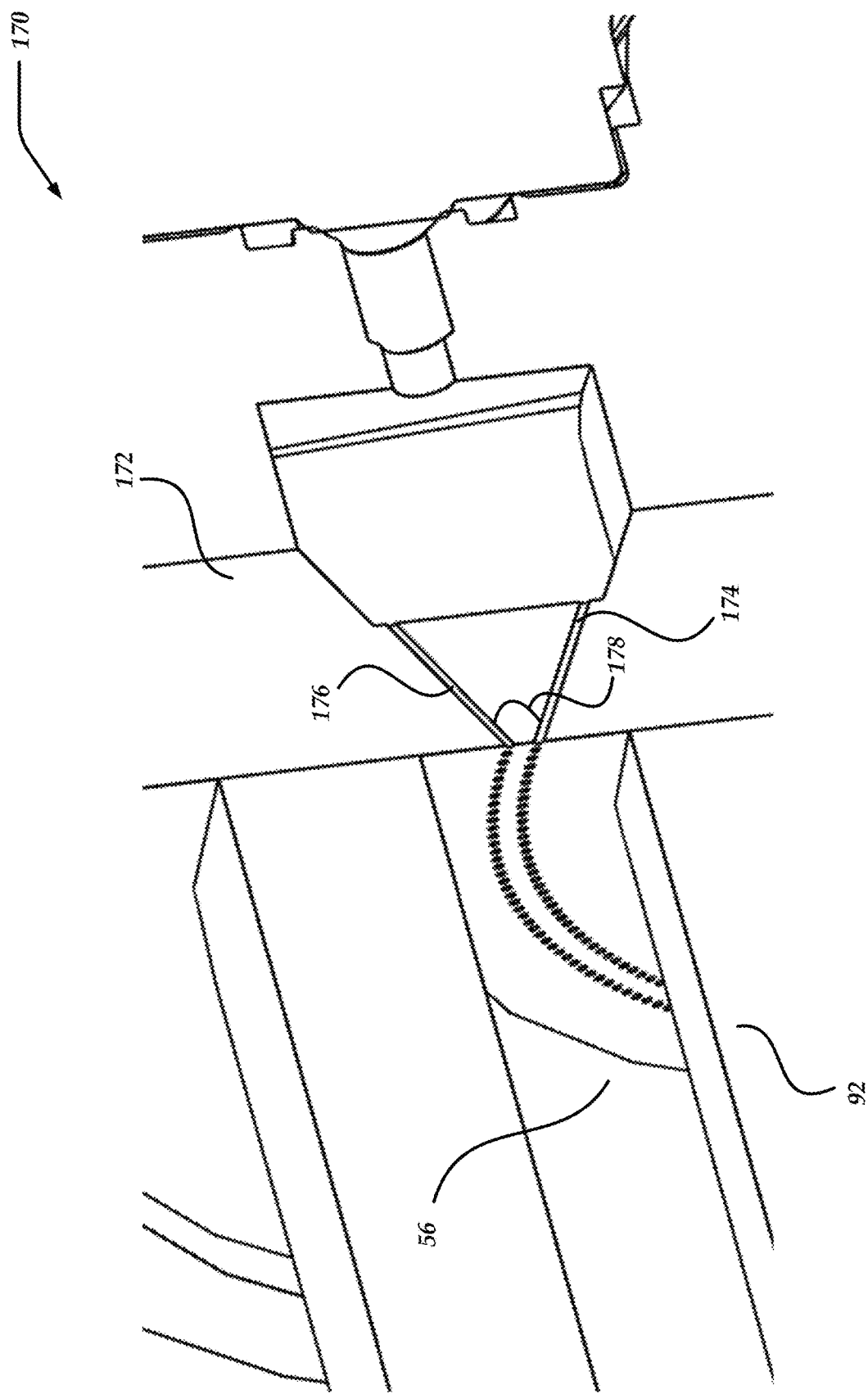
FIG. 16 is an isometric cross-sectional view of a portion of an eighth embodiment of a monopropellant continuous detonation engine in accordance with the principles of the invention.

FIG. 16 shows another embodiment of a continuous-detonation barrier 170 for an MCDE. The barrier 170 is similar to the barrier 162, except that the injector body 172 of the barrier 170 defines two circumferential rows of injector ports such that injector ports in the outer row (for example, the injector port 174) and injector ports in the inner row (for example, the injector port 176) are azimuthally aligned and are oriented relative to each other at an angle 178. In this arrangement, the exit streams of the injector port 174 and the injector port 176 impinge at a point downstream of the injector body 172. The angle is selected based on the monopropellant used, the throughput desired, or the fabrication technique. Such impinging injection ports 174, 176 promote dispersion and vaporization of liquid monopropellant droplets if the monopropellant is injected as a liquid (for example, at the start of a firing before the temperature of the injector body 172 has risen to a level suitable to cause the propellant to be injected as a vapor). Similar to the injector ports of the barrier 162, the injector ports of the barrier 170 have diameters that are small enough and lengths that are long enough to, in combination, suppress each of combustion waves and shock waves traveling upstream in the injection ports to permanently quench upstream-traveling detonation waves in both the liquid phase and vapor phase of the monopropellant. For hydrazine vapor, for example, the detonation cell size is so large that injection ports less than 0.035 inches in diameter and 0.5-0.75 inches in length are sufficiently constricted so as to suppress detonation waves travelling upstream. For hydrazine liquid, the tendency to detonate at temperatures and pressures common in CDREs is negligible.

Figure 17:
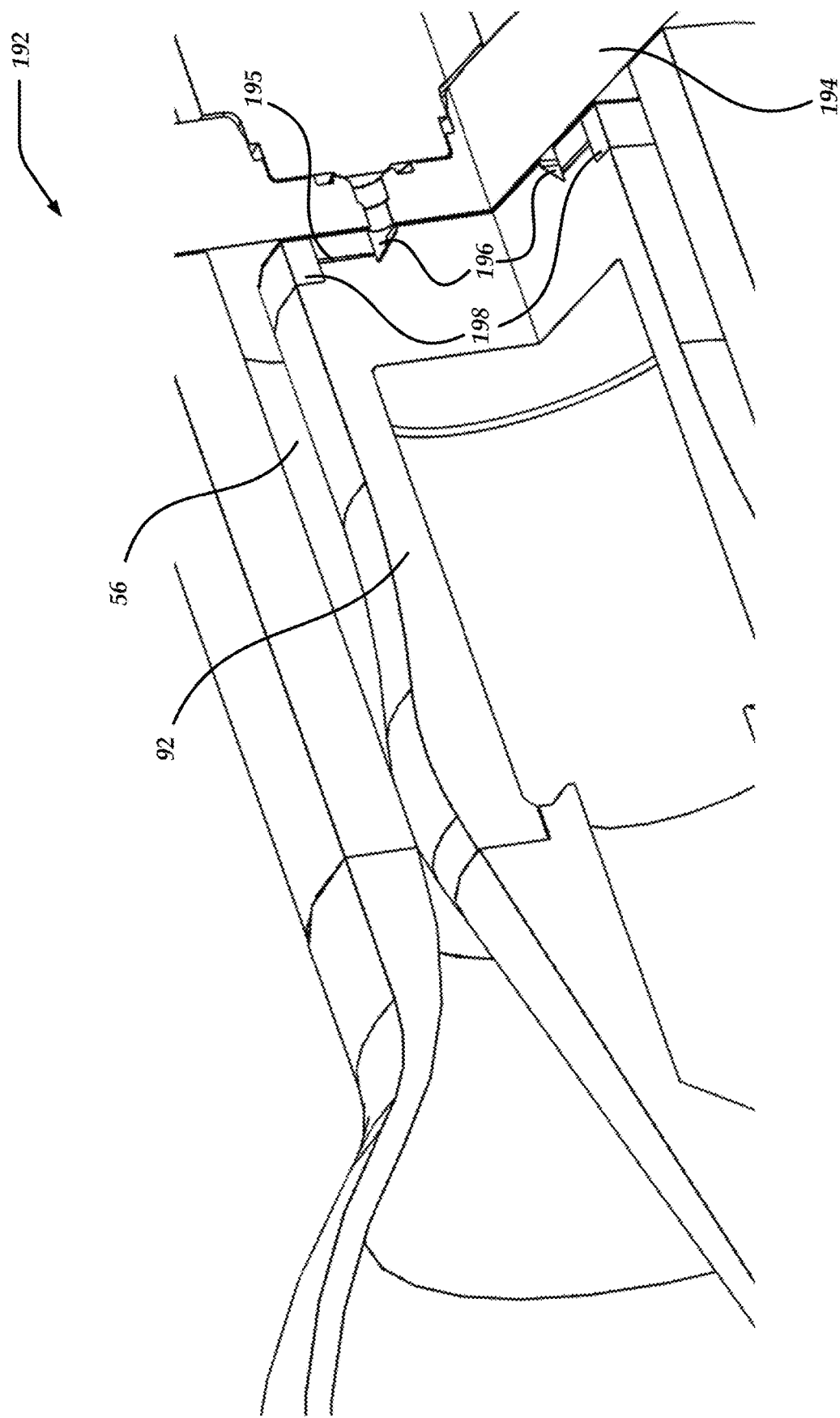
FIG. 17 is an isometric cross-sectional view of a portion of a ninth embodiment of a monopropellant continuous detonation engine in accordance with the principles of the invention.
Figure 18:
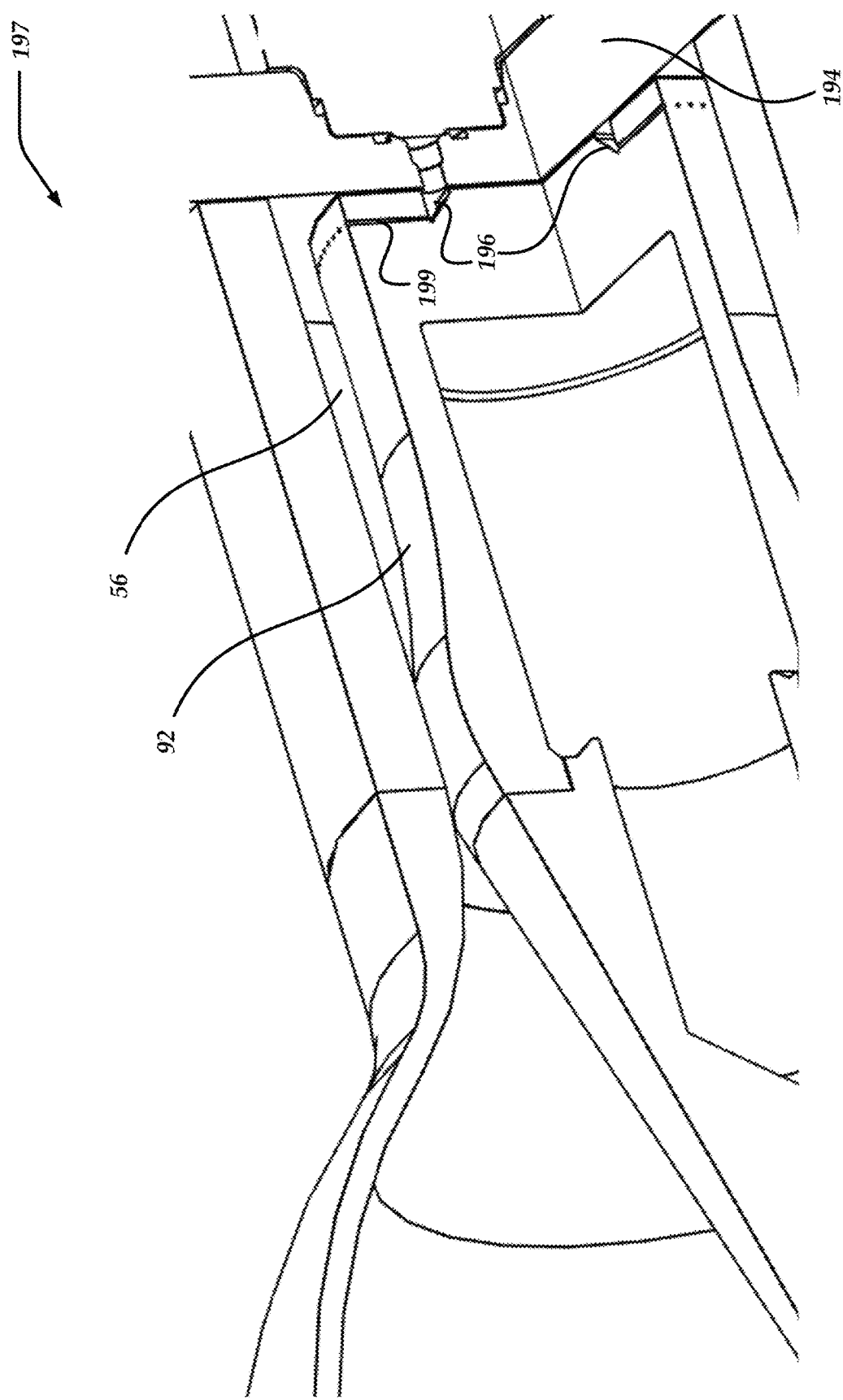
FIG. 18 is an isometric cross-sectional view of a portion of a tenth embodiment of a monopropellant continuous detonation engine in accordance with the principles of the invention.

FIG. 17 shows another embodiment of a portion of another embodiment of a monopropellant continuous detonation engine in accordance with the principles of the invention. The MCDE of FIG. 17 is substantially the same as the MCDE 52, except the continuous-detonation barrier 192 shown in FIG. 17 is different than the continuous-detonation barrier 86 of FIG. 9. Unlike the barrier 86 of the MCDE 52, which injects monopropellant into the channel 56 in an axial direction, the barrier 192 of FIG. 17 injects monopropellant into the channel in a radial direction. Instead of the plenum 68 being defined by the back plate or body 72, the plenum 196 is defined by an azimuthal volume in the center body 92. A series of ports, such as the port 195 similar to the injection ports of the barrier 162 or the barrier 170, optionally fluidly couples an azimuthal insert 198 to the plenum 196. The azimuthal insert 198 is similar to the insert 112 except the difference in shape and position, and the insert 198 is bonded to the center body 92 and the downstream surface of the back plate or body 194. In some embodiments, instead of the insert 198, an MCDE implements a continuous-detonation barrier such as the barrier 197 of FIG. 18 that provides radial injection with discrete injection ports such as the injection port 199, similar to the injection ports of the barrier 162 or the barrier 170, except oriented in a radial direction instead of generally axial directions and defined by the center body 92. The injection ports of the barrier 197 are different from the ports of the barrier 192 in that the injection ports of the barrier 197 directly fluidly couple to the chamber 56 and the plenum 196. In other embodiments using discrete ports without a porous insert, the injection angle is neither axial (zero degrees as shown in FIG. 15) nor radial (90 degrees as shown in FIG. 18) to the direction of thrust and is instead somewhere in between (greater than 0 degrees and less than 90 degrees to the direction of thrust).

In various embodiments, the continuous-detonation barrier 162 or the continuous-detonation barrier 170, whether oriented axially, radially, or at some angle in between axial and radial, include an insert such as the insert 112 or the insert 198 in combination with the discrete, linear injector ports. In some embodiments, the insert is disposed upstream of the injector ports such that monopropellant flows through the insert before reaching the injector ports, and the injector ports inject the monopropellant into the injection region. In other embodiments, the insert is disposed downstream of the injector ports such that monopropellant flows through the injector ports before reaching the insert, and the insert injects the monopropellant into the injection region. Such embodiments with the porous insert downstream of the discrete injection ports promote distribution of the injected monopropellant around the entire circumference of the annulus and also promote vaporization at or near the injector exit. In some embodiments, the material of the insert is disposed in the injector ports along a portion of or the entirety of the length of the injector ports.

Figure 26:
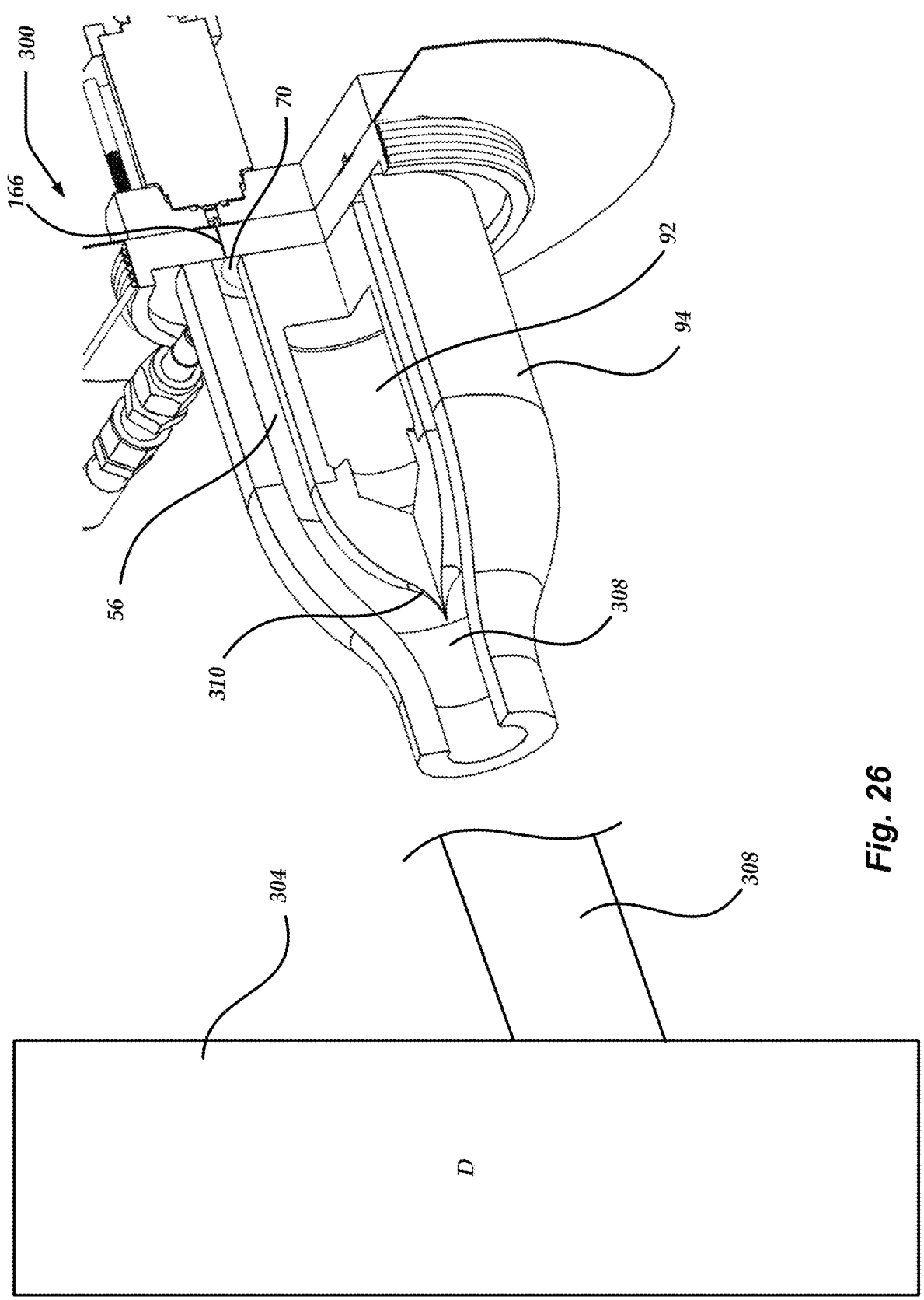
FIG. 26 is an isometric cross-sectional view of a portion of a sixteenth embodiment of a monopropellant continuous detonation engine in accordance with the principles of the invention.
Figure 27:
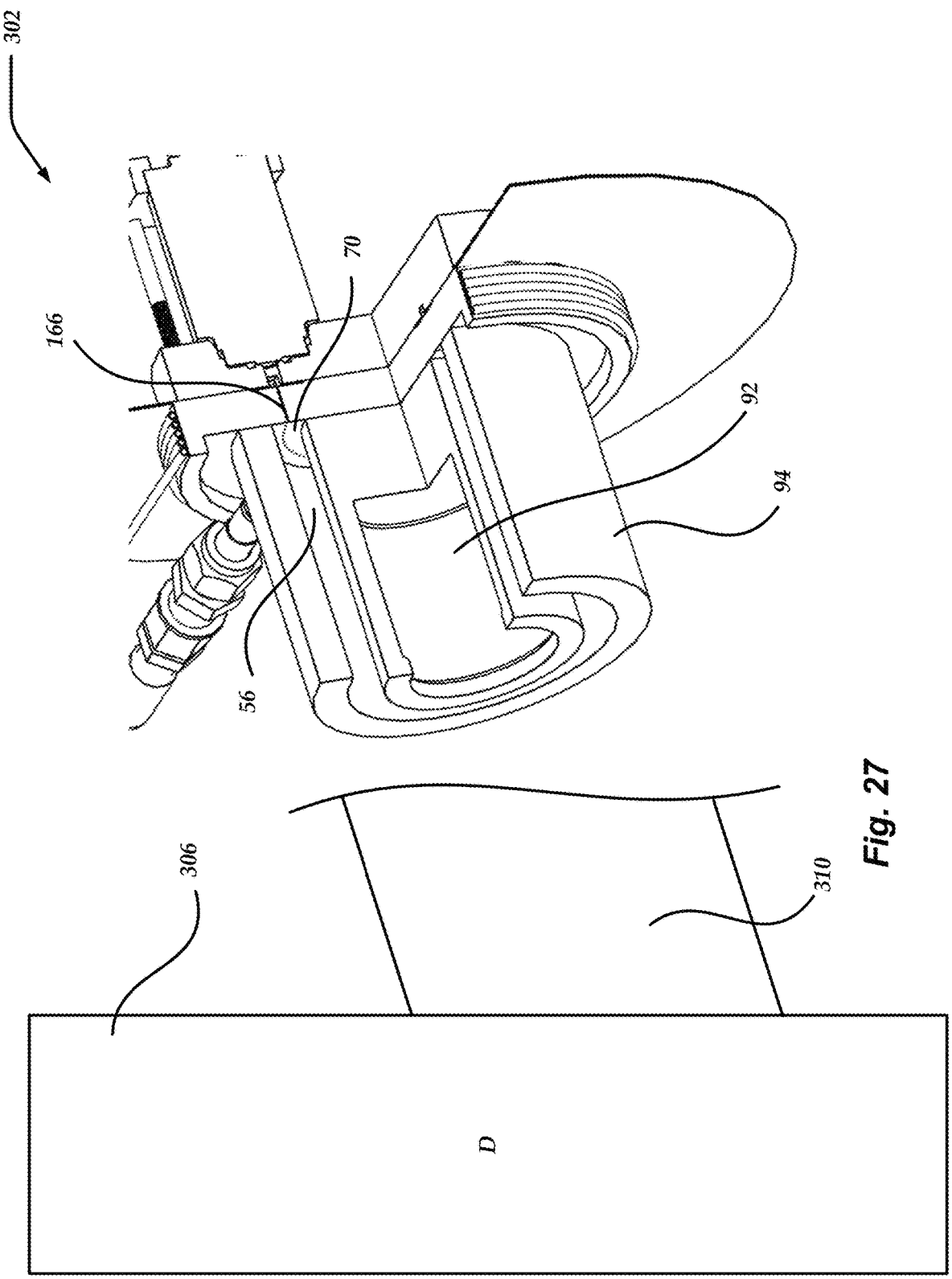
FIG. 27 is an isometric cross-sectional view of a portion of a seventeenth embodiment of a monopropellant continuous detonation engine in accordance with the principles of the invention.

FIG. 26 shows another monopropellant continuous detonation engine 300 in accordance with the principles of the invention, and FIG. 27 shows a further monopropellant continuous detonation engine 302 in accordance with the principles of the invention. In contrast with the embodiments previously explained herein, the monopropellant continuous detonation engines 300, 302 are part of a larger system and do not provide direct propulsion for the vehicle or device on which the monopropellant continuous detonation engines 300, 302 are installed. The monopropellant continuous detonation engines 300, 302 are instead configured as generators that are configured to discharge exhaust gases to a downstream device, such as the downstream devices 304, 306 (labeled as D in FIGS. 26 and 27), such as through conduits 308, 310 that fluidly couple the downstream devices 304, 306 to the outlets of the monopropellant continuous detonation engines 300, 302 (the conduits 308, 310 are shown in broken view for ease of viewing the outlets of the monopropellant continuous detonation engines 300, 302). Accordingly, the exhaust gases from the monopropellant continuous detonation engines 300, 302 provide hot gaseous feed streams for downstream use by the downstream devices 304, 306. In some embodiments, the downstream device 304 includes an electrically augmented propulsion device that is configured to further heat the hot gaseous feed stream from the monopropellant continuous detonation engine 300 to even higher temperatures before expulsion through a nozzle to produce thrust, such as an electrothermal thruster or an arcjet that is configured to generate an electric arc that passes through such gases. As shown in FIG. 26, the outer body 94 of the monopropellant continuous detonation engine 300 defines a gas collection region 308 disposed downstream of the spike 310 and configured to feed the exhaust gases of the monopropellant continuous detonation engine 300 to the downstream device 304 or into the conduit 306. As shown in FIG. 27, the outlet of the monopropellant continuous detonation engine 302 (and optionally the conduit 308) retains the shape of the detonation channel 56, such as the annulus shown in FIG. 27, to drive a device having a similar shape. In some embodiments, the downstream device 306 includes a gas turbine having an annulus that is configured to receive the exhaust gases from the monopropellant continuous detonation engine 302, is configured to be driven by such exhaust gases, and is configured to utilize its torque to drive or pump other fluids, such as gas or liquid propellant to thrusters (e.g., bipropellant chemical thrusters) that are larger than the monopropellant continuous detonation engine 302.

Figure 19:
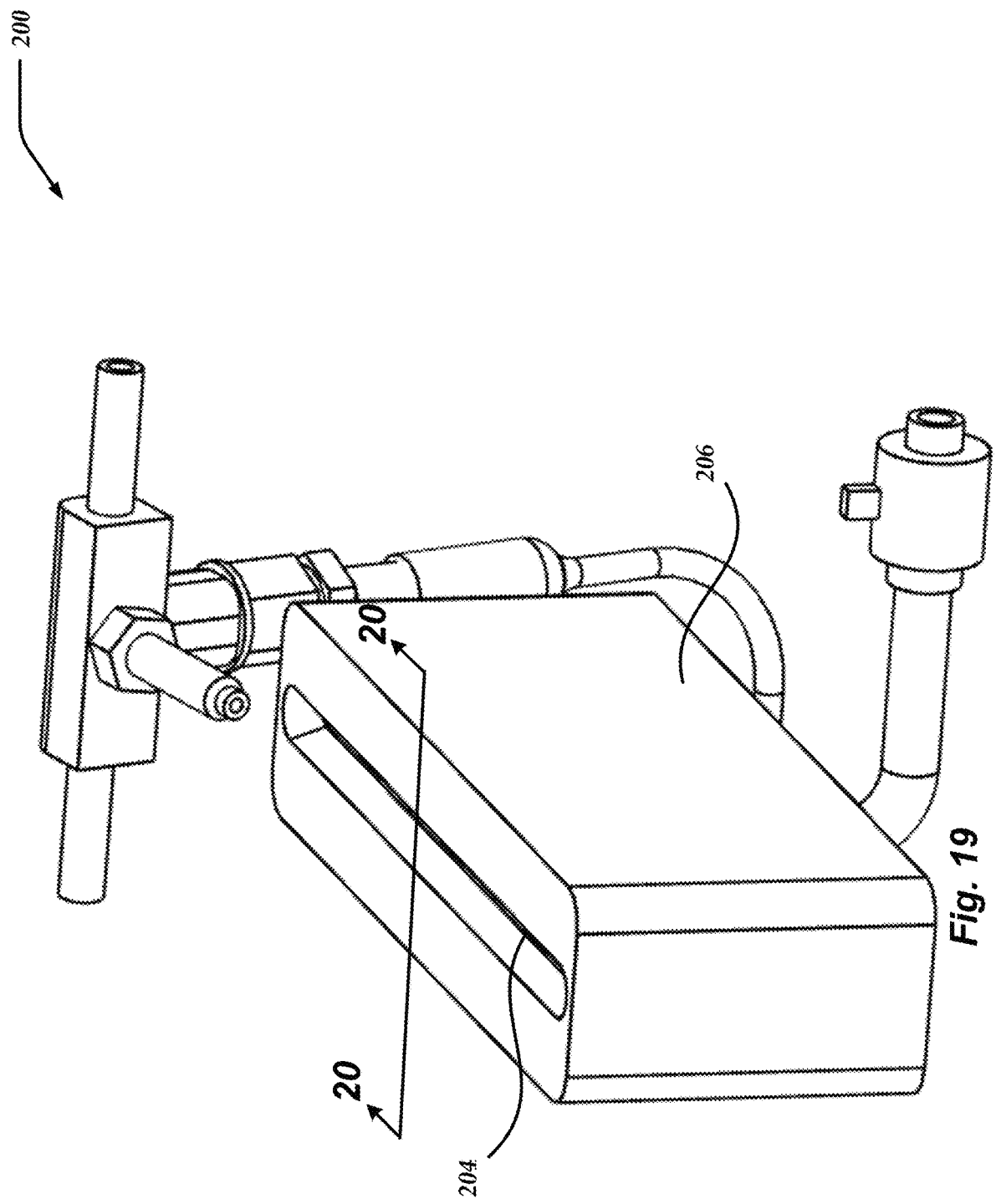
FIG. 19 is an isometric view of an eleventh embodiment of a monopropellant continuous detonation engine in accordance with the principles of the invention.

FIG. 19 shows another monopropellant continuous detonation engine 200 in accordance with the principles of the invention. The MCDE 200 is a linear MCDE, whereas the MCDE 52 is a rotating MCDE. Like the MCDE 52, the MCDE 200 provides better efficiency than conventional deflagration engines using similar monopropellants, but the linear MCDE 200 provides improved compact dimensions or dimension flexibility compared to the MCDE 52. The advantages and operations specific to linear CDEs are described in U.S. application Ser. No. 17/343,679.

In various embodiments, linear MCDEs include a continuous-detonation barrier in accordance with the principles of the present invention, such as any of the embodiments described herein, including a porous injector insert or injector ports alone or in combination with a porous injector insert, at an axial orientation, orthogonal orientation (for example, radial orientation in the embodiment of FIG. 17 or 18 or otherwise perpendicular to the direction of thrust as in linear CDE embodiments), or an orientation between axial and orthogonal. The porosity, shape, and material of the inserts or injectors are selected depending on the monopropellant and system requirements, as explained above regarding rotational MCDEs. The injection angle is selected based on the envelope volume and shape available for the thruster in a given application. For simplicity, however, the following embodiments are illustrated with only axial orientations, but the teachings herein related to other angles described with respect to rotational MCDEs similarly apply to linear MCDEs, except instead of the center body 92, one of the side walls that define the linear detonation channel defines the plenum and houses the insert or injector ports.

Figure 20:
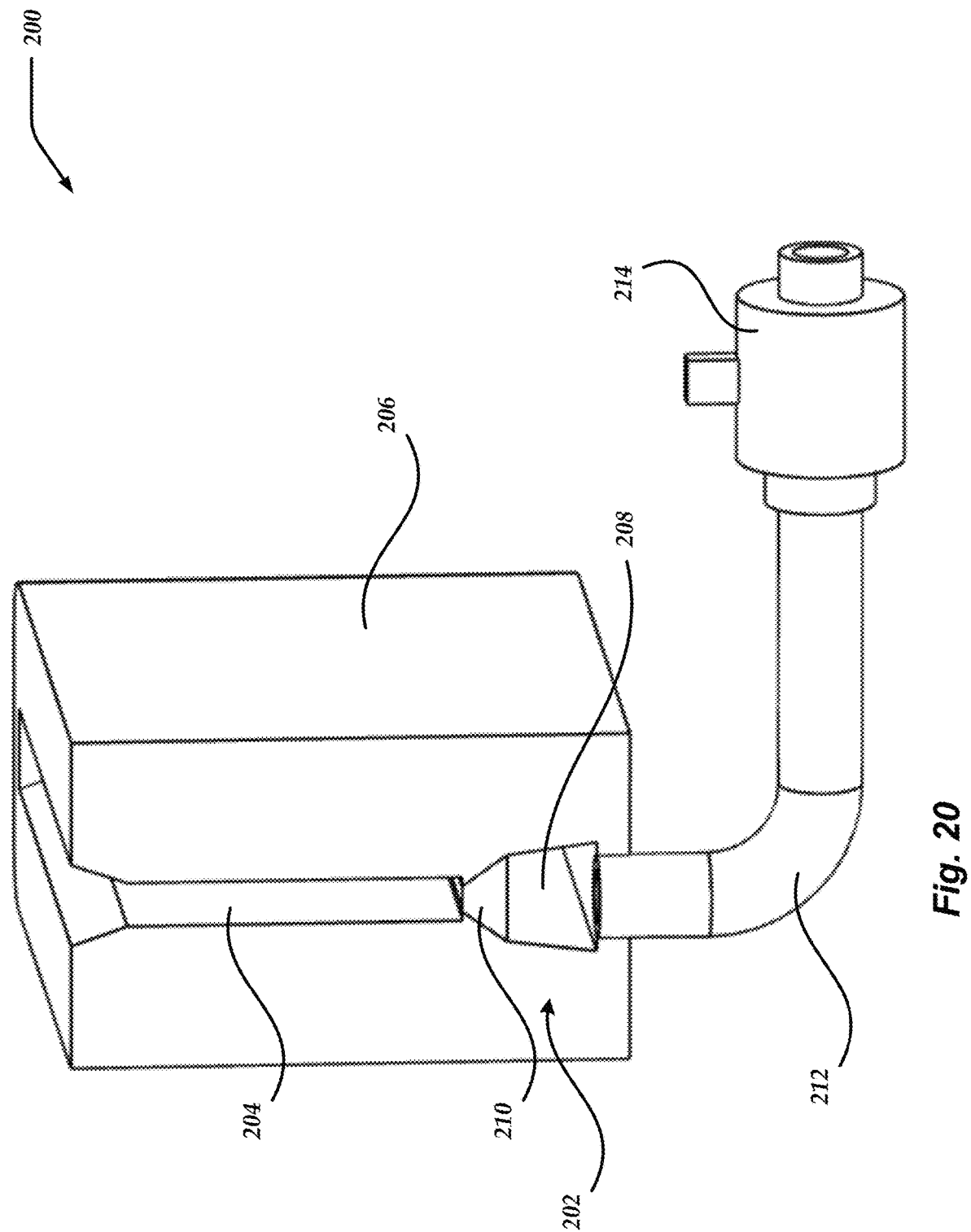
FIG. 20 is an isometric cross-sectional view of the monopropellant continuous detonation engine of FIG. 19, taken along line 20-20 in FIG. 19.
Figure 21C:
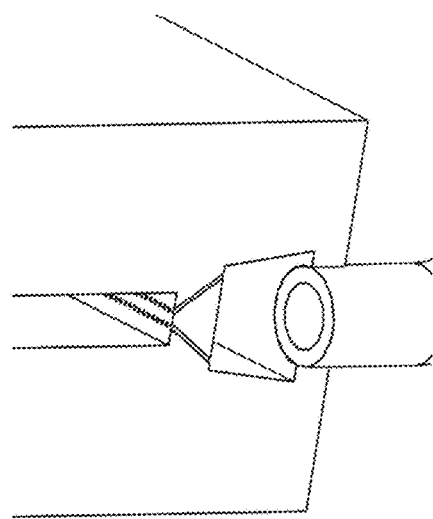
FIG. 21C is an isometric cross-sectional view of a portion of a fourteenth embodiment of a monopropellant continuous detonation engine in accordance with the principles of the invention.

FIG. 20 shows a cross-sectional view of the linear MCDE 200 taken along the line 20-20 in FIG. 19. The MCDE 200 has a continuous-detonation barrier 202 that prevents each of combustion waves and shock waves from traveling upstream from the continuous-detonation channel 204 defined by the engine body 206 of the MCDE to the plenum 208, while also providing for injection of unreacted monopropellant into the detonation channel 204. Similar to the barrier 86, the barrier 202 includes an insert 210 that, together with the plenum 208, extends along the entire length of the channel 204, except the channel 204 is linear instead of circular. The plenum 208 receives monopropellant from the supply tube 212 when the valve 214 opens and, when the plenum 208 is sufficiently pressurized, delivers the monopropellant through the insert 210 into the channel 204. Another view of a portion of the barrier 202 is shown in FIG. 21A, showing the continuous porous insert extending along the length of the channel 204.

Figure 21B:
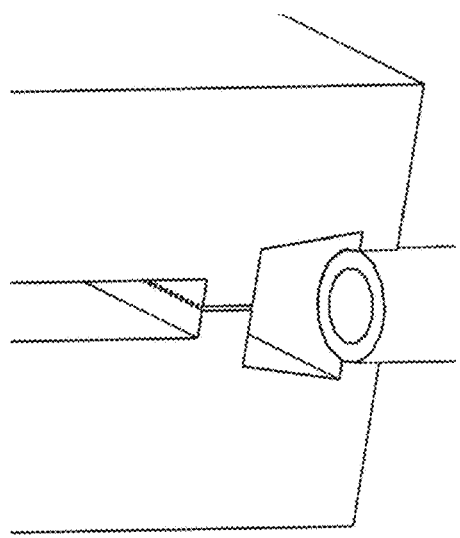
FIG. 21B is an isometric cross-sectional view of a portion of a thirteenth embodiment of a monopropellant continuous detonation engine in accordance with the principles of the invention.
Figure 21A:
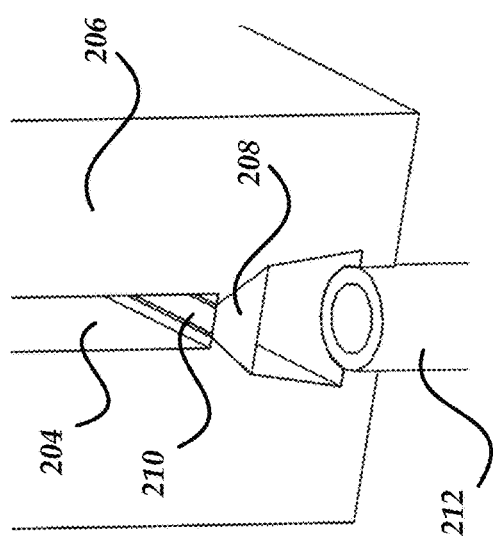
FIG. 21A is an isometric cross-sectional view of a portion of twelfth embodiment of a monopropellant continuous detonation engine in accordance with the principles of the invention.

FIG. 21B shows a cross-sectional view of a portion of a linear MCDE that is similar to the MCDE 200, except the linear MCDE of FIG. 21B has a continuous-detonation barrier similar to the barrier 162, except linear instead of circular. FIG. 21C shows a cross-sectional view of a portion of a linear MCDE that is similar to the MCDE of FIG. 21B, except the linear MCDE of FIG. 21C has a continuous-detonation barrier similar to the barrier 170, except linear instead of circular. In some embodiments, the MCDEs of FIGS. 19-21C are fabricated using additive manufacturing due to the complex shapes of the MCDEs.

Figure 22:
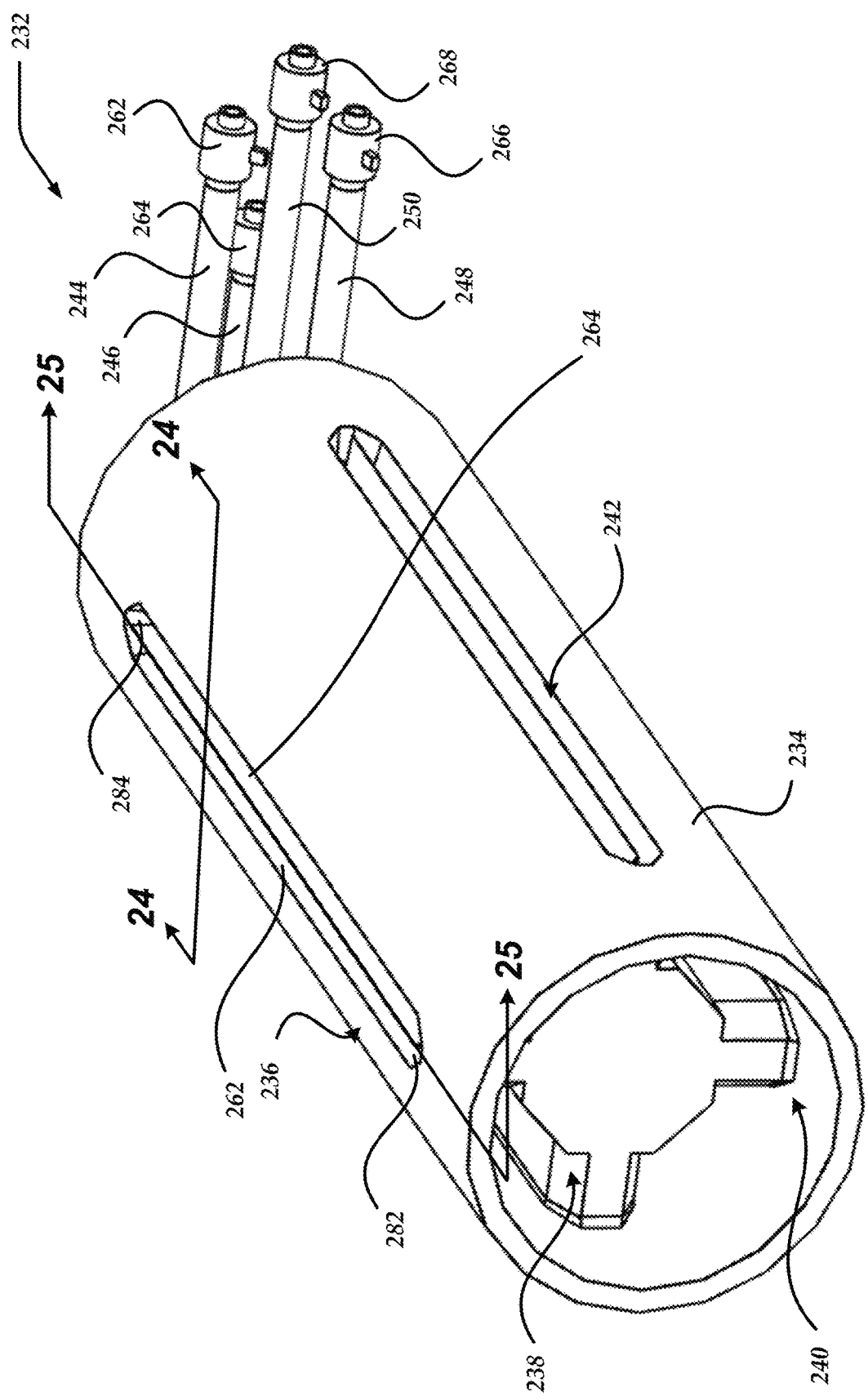
FIG. 22 is an isometric view of a fifteenth embodiment of a monopropellant continuous detonation engine in accordance with the principles of the invention.
Figure 23:
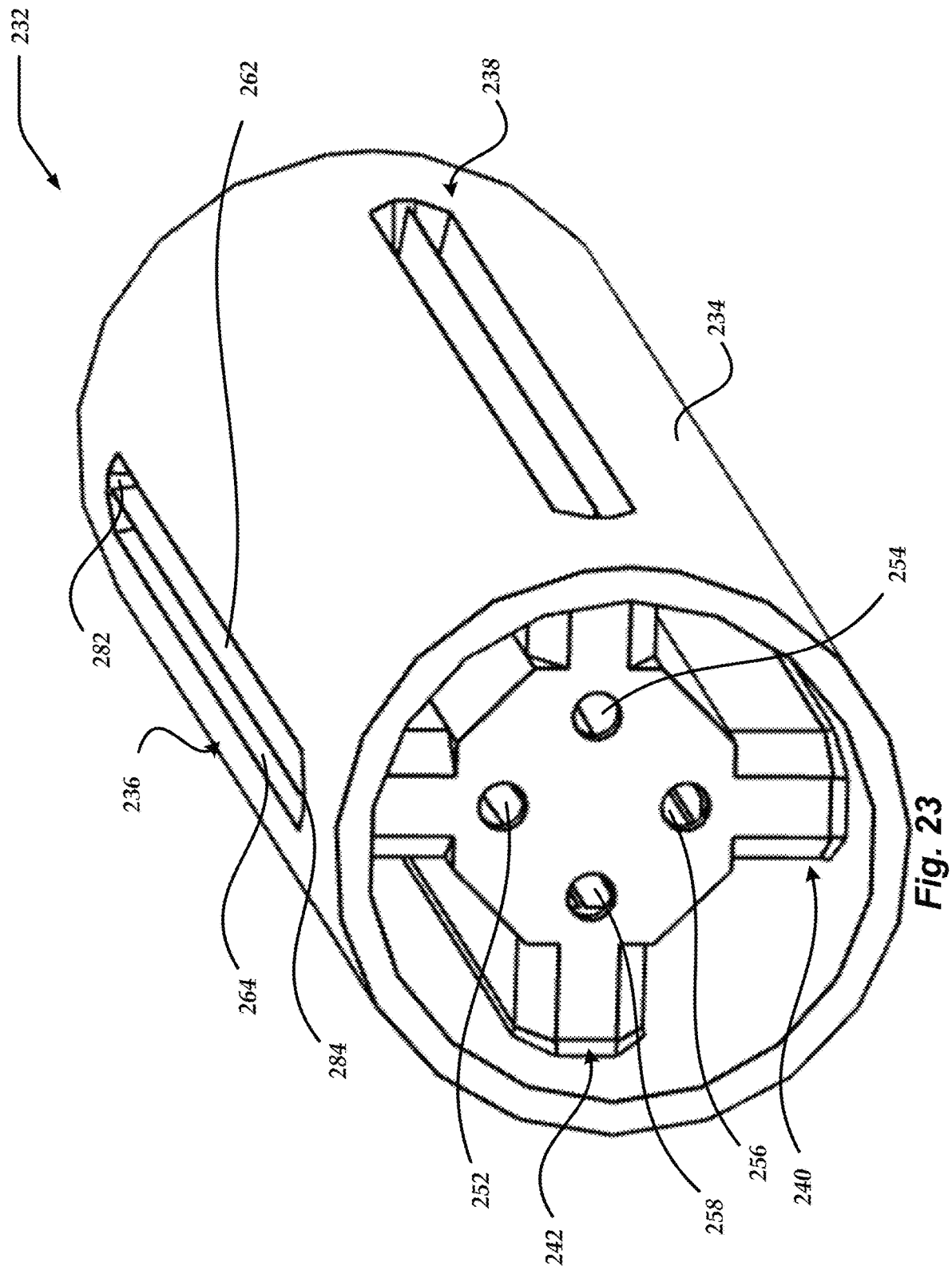
FIG. 23 is an isometric rear view of a portion of the monopropellant continuous detonation engine of FIG. 22.

FIG. 22 shows a linear monopropellant continuous detonation system ("MCDS") 232 (for example, a divert attitude control system ("DACS") that may be used for a missile-launched autonomous kill vehicle ("AKV")) that includes a housing 234 and multiple linear MCDEs 236-242. The advantages and operations specific to linear CDSs are described in U.S. application Ser. No. 17/343,679. The linear MCDEs 236-242 are similar to the linear MCDE of FIG. 19, except the MCDEs 236-242 are dual-channel MCDEs instead of a single-channel MCDE. Each of the linear MCDEs 236-242 is fed monopropellant through a respective one of tubes 244-250 when a respective one of valves 262-268 is open. As indicated by the feeder holes shown in the rear view of FIG. 23, the tubes 244-250 are respectively fluidly coupled to plenums 252-258 of the respective linear MCDEs 236-242. In various embodiments, multi-channel MCDEs include a continuous-detonation barrier in accordance with the principles of the present invention, such as any of the embodiments described herein, including a porous injector insert or injector ports alone or in combination with a porous injector insert, at an axial orientation, radial orientation, or an orientation between axial and radial. The characteristics of those injector systems are selected as described above with respect to linear single-channel MCDEs.

Figure 24:
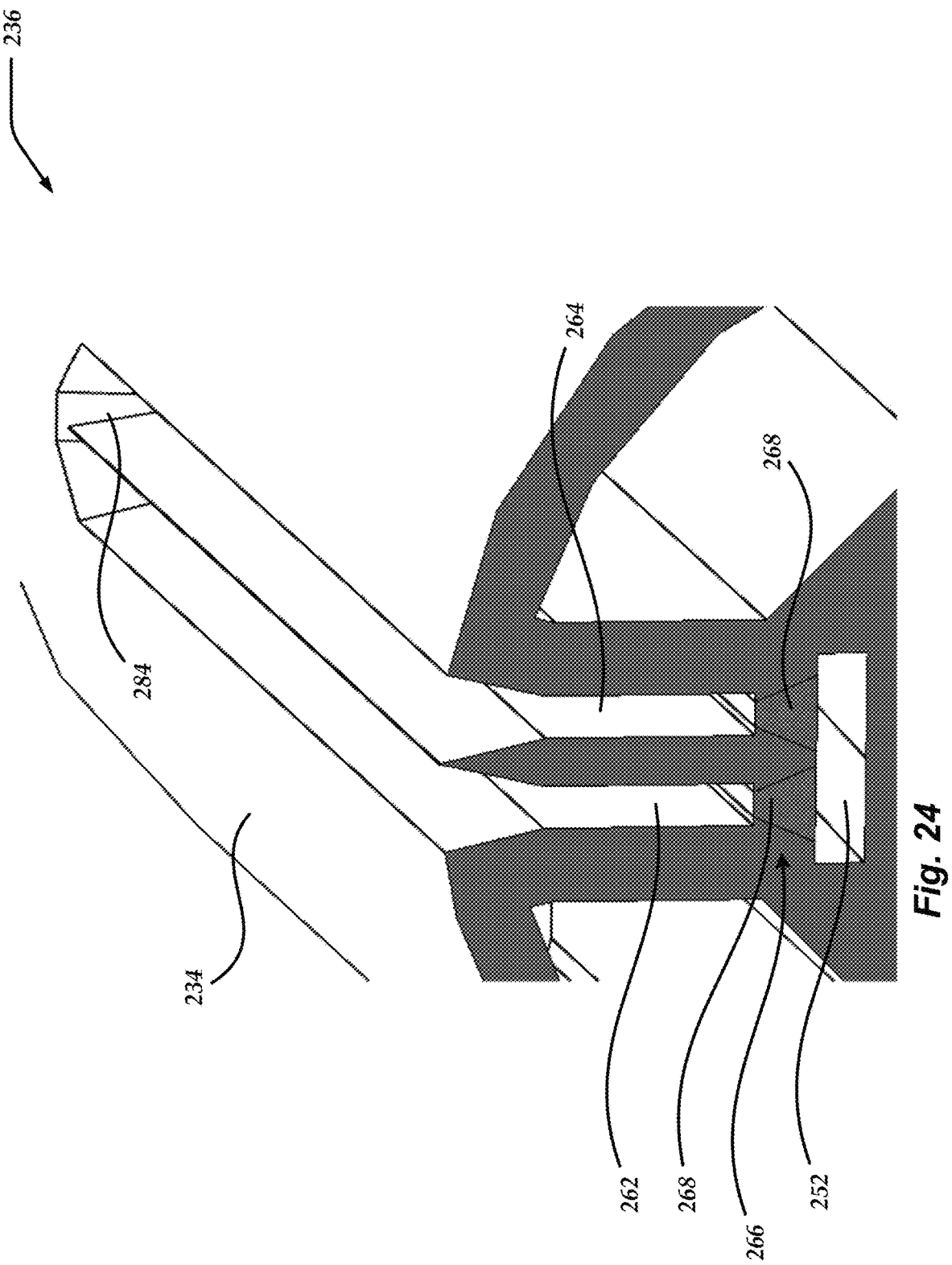
FIG. 24 is an isometric cross-sectional view of the monopropellant detonation engine of FIG. 22, taken along line 24-24 in FIG. 22.

For illustration purposes, FIG. 24 shows a cross-sectional view of the linear MCDE 236 in which each of the channels of the dual-channel linear MCDEs, such as the channels 262, 264, are supplied with monopropellant by continuous-detonation barriers, such as the continuous-detonation barrier 266. For multi-channel MCDEs, such as the dual-channel linear MCDE 236, the continuous-detonation barrier includes an insert, such as the insert 268, that extends along the entire length of each channel. As shown in FIG. 24, the insert 268 extends along the entirety of the lengths of both channels 262, 264 by connecting at both end portions 282, 284 of the channels 262, 264. In other embodiments, each channel 262, 264 has a discrete insert, and the inserts do not wrap around the end portions of the center separator between the channels 262, 264 where the channels 262, 264 meet each other (for example, the shock waves bounce off the end portions to reignite detonation waves when encountering the detonable medium injected from the next insert). In some embodiments, each channel in a multi-channel MCDE has its own discrete insert that extends along the entire length of the respective channel. Accordingly, the multi-channel MCDEs are structured and arranged and operate similarly to the linear MCDE of FIG. 19.

Figure 25:
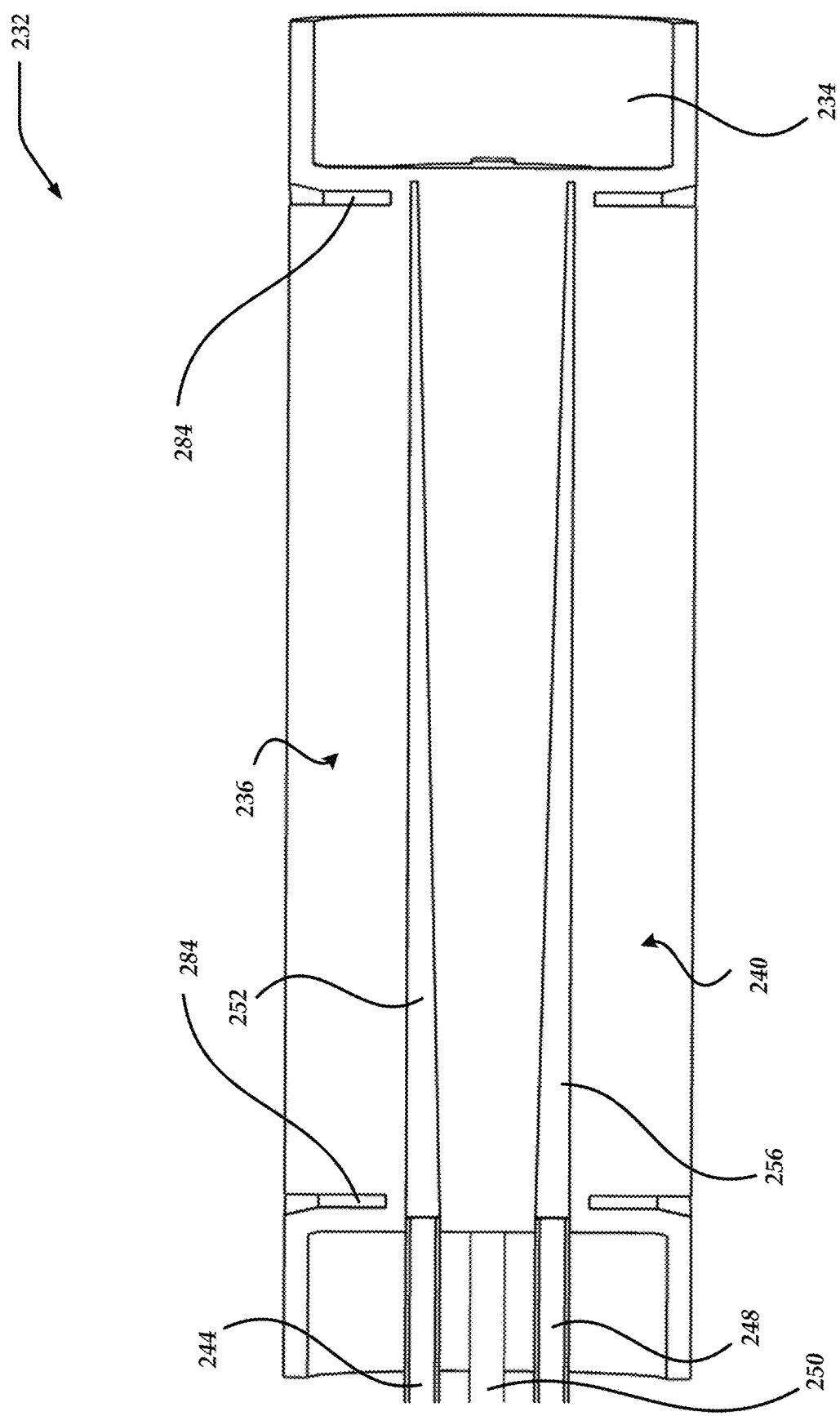
FIG. 25 is an isometric cross-sectional view of the monopropellant continuous detonation engine of FIG. 22, taken along line 25-25 in FIG. 22.

As shown in the cross-sectional view of FIG. 25, the plenums 252-258 have volute shapes such that the cross-sectional area of the plenums 252-258 varies along the distance away from the respective propellant inlet to facilitate even distribution of monopropellant along the length of the plenums 252-258. In embodiments in which the inlet is offset from an end portion of a plenum, such as in the middle of the plenum, the plenum has a volute shape that tapers in both directions that extend away from the inlet. Accordingly, in some embodiments, the plenums 68, 168, 196, 208 taper as the distance to the monopropellant inlet to the plenum increases to maintain a constant-mass flux throughout the plenum and to allow even distribution of monopropellant downstream into the injector (for example, the insert or the injector ports).

A storage tank onboard the vehicle on which the MCDE is installed delivers monopropellant to the plenums of the present invention by the feed lines described herein. The valves are therefore configured to turn flows of the monopropellant on and off. In some embodiments, the valves are fast-acting valves and disposed within a few inches of the plenum entrance to facilitate rapid pulsing of the MCDE with reduced dribble volumes, actuation times, and duty-cycle times, as described in U.S. application Ser. No. 17/343,679.

The dimensions of the injectors (for example, the inserts or the injector ports) and the detonation channel are selected based on the monopropellant chosen, the desired thrust, and the propellant feed pressure. The thrust developed is a function of the mass flow rate into the detonation channel and the specific impulse GO achievable with the particular propellant. The mass flow rate of the monopropellant is determined by the system feed pressure, the average back pressure in the detonation channels, and the effective cross-sectional area of the injector pores or ports, as explained above. For given injector characteristics and system feed pressure, the thrust scales approximately linearly with the MCDE channel length. Similar to the engines disclosed in U.S. application Ser. No. 17/343,679, the linear MCDEs of the present invention may be stacked side-by-side to provide increased thrust in a rectangular array. Separation distance between the individual LCDREs is selected based on, among other things, thermal management, desired total thrust, and system dimensions. In some embodiments, other stacking or arrayed arrangements are selected to meet the special requirements of a particular application, such as linear MCDEs being arranged to form the sides of a rectangle, square, or other polygon with an available space between them being unconsumed by the MCDEs to leave such space available for other payloads or equipment. The various modifications to linear CDEs disclosed in U.S. application Ser. No. 17/343,679 are equally applicable to linear MCDEs, such as curved arcs in the channels wherein four curved linear MCDEs are spaced around the circumference of the aft end of a rocket launcher and, by intermittent, controlled actuation, are used to provide thrust vector control.

The rotational MCDEs herein are depicted as being throated. In some embodiments, the rotational MCDEs are not throated. The linear MCDEs herein are depicted as not throated. In some embodiments, the linear MCDEs are throated to increase pressure in the channel and thus to boost thrust and specific impulse.

Hydrazine ($N_2H_4$) is the most common monopropellant used today in space propulsion, and in all known monopropellant engines, a catalyst is used to promote deflagrative decomposition. The decomposition proceeds through a complex chain of chemical intermediates, but the overall reaction is most commonly written as: $2N_2H_4 \rightarrow 2NH_3+N_2+H_2$. In many catalytic thrusters, the endothermic decomposition of $NH_3$ to lighter species is also promoted by the catalyst bed, thus reducing the temperature of the exhaust gases and the $I_{sp}$ of the thruster. The state of the art for current, catalytic hydrazine monopropellant thrusters is a specific impulse ($I_{sp}$) of about 230 lbf-sec/lbm, and for specific lower-life applications as high as 240 lbf-sec/lbm, which is 35 sec below the theoretical maximum of about 265 lbf-sec/lbm for this reaction. Approximately 15 lbf-sec/lbm of the difference is due to heat loss, nozzle efficiency and Rayleigh losses. The remaining 20 lbf-sec/lbm is due to ammonia dissociation. As noted above, the decomposition of hydrazine proceeds through an intermediate component, ammonia ($NH_3$). In current hydrazine engines, the residence times in the catalyst bed allow 30-50% of the ammonia to decompose endothermically, thus reducing the $I_{sp}$. In the MCDE, the catalyst bed is eliminated or omitted from the main propellant flow (contrasted with the mandatory use of a catalyst bed in the reaction chamber of a conventional monopropellant thruster), which in combination with the shorter residence times facilitated by a hydrazine CDE, limit the time for this ammonia decomposition. In some embodiments, with no ammonia dissociation, the theoretical $I_{sp}$ of a hydrazine CDE engine increases by 20 lbf-sec/lbm. A 20 sec improvement in $I_{sp}$ with no ammonia dissociation leads, in some embodiments, to nearly a 10% improvement in $I_{sp}$ over catalytic hydrazine monopropellant thrusters.

Vapor-phase hydrazine ($N_2H_4$) is known to be difficult to detonate, while liquid hydrazine is very insensitive to detonation, requiring extremely high pressures to induce initiation. The structure of detonation waves in hydrazine vapor is similar to that of other bipropellant detonation waves. The following values are, in some embodiments, for 100% $N_2H_4$, but the present invention facilitates omitting a catalyst and therefore can operate with less-pure fuel, such as fuel that includes water (note that fuel with water in it is less susceptible to flashback (see the next paragraph)): At initial ambient pressures of 1 atm (14.7 psia) and temperature of 387K (237 F), detonation wave velocities are $D_o$=2510 m/sec, max pressure spike P≈409 psia, maximum temperature T=2050K (3230 F), and detonation cell size λ ≈2.4 mm (0.094 in). Discrete injector ports that each have diameters as low as 0.009 inches facilitate suppressing vapor-phase detonation of hydrazine and are readily achievable with conventional fabrication techniques. Moreover, small pore sizes with rough pore walls can be fabricated using additive machining techniques. Such roughened pore walls facilitate further dissipation of detonation waves and shock waves. Detonation cell size is inversely proportional to ambient pressure for hydrazine vapor. For example, at initial ambient pressures of 10 kPa (1.4 psia), the detonation cell size for hydrazine vapor is ≈10 mm (0.393 inches). Thus, as ambient pressure decreases, the pore size can increase while still quenching detonation waves. By contrast, the detonation cell size at the typical maximum feed pressure of 400 psia is approximately 1 mm (0.039 inches). Detonation-quenching pore sizes for pure hydrazine CDEs can therefore be readily fabricated using known manufacturing techniques to accommodate the range of feed pressures expected for such engines.

Less pure hydrazine is acceptable in part because catalyst contamination is not an issue but also because, with the facilitated elimination of $NH_3$ decomposition, facilitated performance is higher than that of a pure deflagration (catalytic) engine. Use of hydrazine with higher amounts of water also retards detonability of liquid hydrazine, thus decreasing the probability of backflash and allowing injectors with higher permeability porous inserts, or relatively larger discrete injector ports.

Hydroxylammonium nitrate ($NH_3OHNO_3$), also called HAN, is utilized in some embodiments. Two options to replace hydrazine as a monopropellant for space applications are hydroxylammonium-nitrate-based propellants (HAN—primarily U.S. efforts) or ammonium-dinitramide-based propellants (ADN—primarily European efforts). One type of HAN monopropellant is AF-M315E. Either or both HAN and ADN are used in some embodiments, and each have lower toxicity than hydrazine (i.e., HAN and ADN are each a green monopropellant that does not require wearing hazmat suits to handle), as well as much lower vapor pressures; thus, human exposure is much easier to control and limit. HAN would not be expected to work in a continuous detonation engine because the conventional wisdom is that it will not detonate, but the prior experiments relied upon placing a tank of HAN next to a fire to see if detonation would occur. None of those experiments impacted the HAN with a strong, donor detonation wave as provided by the pre-detonator of the present invention. All of the HAN-based monopropellants are known as "green" propellants because they do not require the extreme steps to prevent human exposure that are required for hydrazine. The ability to use green monopropellants as enabled by the present invention is thus highly attractive to the commercial and military space industries.

The temperatures required for catalytic ignition and reaction of green monopropellants are significantly higher than those for hydrazine, and the reaction products are more corrosive to the catalyst chamber and the catalysts themselves. These drawbacks are more problematic as the required thrust and thus the diameter of the thruster and catalyst bed increases. Therefore, the elimination of the catalyst bed for HAN-based monopropellants not only facilitates increased reliability, but also enables scaling up to higher thrust levels currently unattainable with conventional green monopropellant thruster technology.

The shorter residence times of monopropellant CDEs, compared to those of conventional deflagrative combustion chambers, also offers other advantages. Nitric acid is an intermediate component of HAN decomposition reactions. Shorter residence times mean less time for nitric acid to degrade chamber (annular) walls and catalysts.

Gap testing by the Air Force Research Laboratory (AFRL) indicates AF-M315E has low susceptibility to detonation in confined storage but detonation has been observed in Full-Scale Slow Cook-off Testing at low temperatures and pressures. For the lower vapor pressure of the HAN-based monopropellants, the porous injector insert or discrete injector body is pre-heated prior to engine startup. Such heaters are not difficult to incorporate as described above (see FIGS. 6 and 7). After startup, the heater is turned off once the heat generated by the detonation waves is adequate to support vaporization.

In some embodiments, the HAN-based mixed propellant is partially broken down catalytically into a mixture of $NO_x$, $H_2$, and $CH_4$, which mixture is then injected into the annulus 56 and detonated as previously described with respect to other monopropellants. The catalysts for such partial dissociative reactions are different than those used to promote complete reaction in conventional thrusters because the optional catalyst here does not promote full decomposition. In some embodiments, such "pre-catalyst" is incorporated into the internal surfaces of the porous injector inserts.

Other less common monopropellants are used in some embodiments, such as nitrous oxide, hydrogen peroxide, nitromethane, ethylene oxide, nitrous oxide/ethylene, and others. However, the monopropellants currently in use that are difficult to detonate (for example, hydrazine, AF-M315E, HAN-based, and ADN-based propellants) are amenable to use in CDEs of the present invention.

Due to unfortunate explosions reported in early CDE experiments with highly detonable pre-mixed bipropellants (e.g., $C_2H_6$ and GOX), pre-mixed bipropellants have been avoided in subsequent CDE work. However, the shock and detonation suppressing capabilities of the inventions disclosed herein are such that in certain instances they facilitate safer use of certain combinations of pre-mixed bipropellants. In some embodiments, combinations utilized include all non-hypergolic pairs of rocket propellants in common use today.

The use of monopropellant CDEs and pre-mixed bipropellants in CDEs thus represents a fundamental shift in the way monopropellant propulsion and pre-mixed bipropellant propulsion are envisioned, designed, and deployed. This disclosure discloses designs for CDEs, including both rotational CDEs and linear CDEs that facilitate safe use of monopropellants, as well as pre-mixed combinations of bipropellants.

As stated above, the elimination of the requirement for a catalyst bed and catalyst bed heaters as achieved by some embodiments of the present invention is advantageous at least because the catalyst both draws significant power for the heaters and is a major life limiting factor on all forms of monopropellant thrusters. A non-catalytic monopropellant thruster of some embodiments herein facilitates eliminating one or both of these shortcomings. Many monopropellants are readily detonable in the vapor phase. Monopropellant CDEs can therefore be started with a detonation initiator such as an auxiliary pre-detonator that delivers a single donor detonation pulse as shown in FIG. 6 or a simple spark or torch at the annulus exit as shown in FIG. 19, and then monopropellant CDEs run stably in continuous detonative mode until propellant flow is intentionally terminated, utilizing the principles disclosed in U.S. application Ser. No. 17/343,679. Elimination of the catalyst bed and catalyst bed heaters as achieved by some of the embodiments disclosed herein facilitates increasing the reliability and service life of monopropellant engines and reducing the time and expense to develop and qualify new engine designs. A non-catalytic monopropellant thruster as achieved by some of the embodiments disclosed herein also facilitates reducing the power needed to start the thruster and enable it to be instantaneously available for use.

Detonation combustion provided by the present invention facilitates producing higher temperatures and pressures in the reaction products and thus higher efficiency than conventional deflagration engines using similar propellants. Moreover, because no mixing is required for a monopropellant, the present invention eliminates the risk of incomplete mixing of separately injected fuel and oxidizer prior to detonation wave arrival, which can result in incomplete detonation in bipropellant CDEs with subsequent parasitic (less efficient) deflagration of the un-combusted reactants. A higher detonation/deflagration ratio therefore facilitates producing higher efficiency and performance ($I_{sp}$) compared to current bipropellant CDEs.

The present invention also facilitates improved control over unwanted endothermic reactions. In the case of hydrazine, the present invention facilitates avoiding the endothermic decomposition of chemical intermediates, such as ammonia ($NH_3$), which is catalyzed by the catalyst bed, because the catalyst bed is preferably eliminated. Higher temperature reaction products therefore facilitate producing higher engine performance ($I_{sp}$).

As used herein, the following terms take the meanings explicitly associated herein, unless the context clearly dictates otherwise. The term "configured" as used herein means an element being one or more of sized, dimensioned, positioned, or oriented to achieve or provide the recited function or result. The term "substantially" or "approximately" refers to the described value or a range of values that include all values within 5, 10, 20, 30, 40, or 50 percent of the described value. The term "directly coupled" as used herein means that a component contacts (for example, when bolted) or is welded to another component. The term "indirectly coupled" as used herein means that a first component is coupled to a second component by way of one or more intervening components that are directly coupled to the first and second components. For example, a first component that is indirectly coupled to a second component is directly coupled to a third component, which may be directly coupled to the second component or to a fourth component that is directly coupled to the second component. The term "coupled" should therefore be understood to disclose both direct and indirect coupling of components or elements that are described as being coupled to each other.

The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular. The term "one or more" discloses no more than a single one and also discloses more than one, up to and including all. Many embodiments disclosed herein have shared or similar elements or operate on the same or similar principles, so such shared or similar elements or principles are typically not numbered or described for ease of reading where such numbering or description would be duplicative.

The term "strong" as used herein in the context of the donor detonation wave (i.e., the pre-detonation wave) refers to a detonation wave that is strong enough to initiate detonation in the monopropellant injected into the annulus 56. The term "donor detonation wave" or "donor wave" as used herein refers to a detonation wave that travels through a different propellant than the propellant injected into the annulus 56, preferably a more easily detonable propellant such as a bipropellant. Accordingly, the present invention facilitates carrying only small amounts of separately stored propellants.

The term "monopropellant" as used herein refers to one or more propellants that are stored together in one tank without decomposition. For example, hydrazine is a true monopropellant that consists of a single propellant, but it is dangerous and unhealthy (i.e., it requires wearing hazmat suits to handle hydrazine). So-called "green monopropellants" are less dangerous and unhealthy (i.e., hazmat suits are not required to handle green monopropellants) and include multiple chemically different propellants that are stored together in one tank. Monopropellants are conventionally believed to require injection onto a catalyst to promote decomposition prior to ignition. The term "bipropellant" (in contrast with the term "pre-mixed bipropellant") as used herein refers to one or more propellants that, once mixed with each other, begin decomposition without a catalyst. Bipropellants are typically used in very large engines and are stored separately from each other, are mixed only in the decomposition chamber, and are ignited with a spark without a catalyst. For example, hypergolic propellants automatically react when mixed with each other and therefore must be stored separately to prevent premature decomposition and are injected into a reaction chamber where they react with each other to promote ignition. The term "pre-mixed bipropellant" (in contrast with the term "bipropellant") as used herein refers to multiple propellants that are stored together in one tank without decomposition and are therefore covered by the term "monopropellant" as used herein.

While the preferred embodiment of the invention has been illustrated and described, as noted above, many changes can be made without departing from the spirit and scope of the invention. For example, in some embodiments, the monopropellants are started by deflagrative torch located outside the annulus or channel near the channel exit, as shown in FIG. 19 and as disclosed in U.S. application Ser. No. 17/343,679. In other embodiments, the pre-detonator of FIG. 6 is mounted at the exit of the channel where such torch igniter is shown, rather than near the injector face. In some embodiments, spark ignition is utilized to ignite the monopropellant using the configurations disclosed in U.S. application Ser. No. 17/343,679. In some embodiments, pre-heating the injectors is omitted for most hydrazine applications, especially for in-space propulsion where the initial propellant flow on startup is exhausting to space vacuum, which promotes vaporization, even with no pre-heating. In some methods, the various start methods are implemented on the monopropellant vapor. Once started and in normal continuous-detonation operation, steady state thermal soak back causes vaporization of the liquid monopropellant to occur somewhere within the injector. In other embodiments, heating is implemented for startup, and the heater is simply powered by electricity and attached to an outside surface of the injector body or embedded within it, with insulation from the space environment to conserve energy, and the heater is turned off once the engine starts to conserve power and prolong life of the heater. In some embodiments, the rotating CDRE has a diameter of 1.5-18 inches, a channel width of 2-8 millimeters, a porous injector-insert permeability of 0.01-4 Darcy or a discrete injector-port diameter of 0.015-0.03 inches, and injector axial length of 0.1-1 inches. Such parameter ranges are configured to provide an overall thrust range of 0.1-500 lbf with hydrazine as the monopropellant. With the exception of very low thrust engines, this range covers most of the thrust range of catalytic engines currently qualified for in-space use.

As another example, each disclosure of a component having a feature or characteristic is intended to also disclose the component as being devoid of that feature or characteristic, unless the principles of the invention clearly dictate otherwise. Accordingly, the scope of the invention is not limited by the disclosure of the preferred embodiment. Instead, the invention should be determined entirely by reference to the claims that follow. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (for example, "The apparatus or method of any one of the preceding or subsequent claims . . . ."). This disclosure is also intended to disclose the subject matter of any one of the dependent claims, as if it was an independent claim, with or without all or a portion of the subject matter of the original independent claim(s) or any other subject matter disclosed herein.

I claim:

1. A continuous detonation engine comprising:
    an engine body that defines a continuous detonation wave channel;
    a monopropellant feed assembly that includes a valve fluidly coupled to one or more bodies that define a plenum and an injection region, the one or more bodies being disposed at a closed end portion of the continuous detonation wave channel, the monopropellant feed assembly configured to deliver a fluid monopropellant from a monopropellant storage tank through the valve into the plenum and through the injection region into the detonation wave channel;
    an injection heater thermally coupled to the one or more bodies that define the injection region, the injection heater configured to promote vaporizing the monopropellant, whereby detonability of the monopropellant is increased; and
    a detonation initiator fluidly coupled to the detonation wave channel, the detonation initiator configured to initiate continuous detonation of the monopropellant in the detonation wave channel,
    whereby the continuous detonation engine is configured to initiate and sustain continuous, detonative combustion without a catalyst that is configured to promote deflagrative combustion of the monopropellant.

2. The continuous detonation engine of claim 1, wherein at least one of the one or more bodies is integral with the engine body.

3. The continuous detonation engine of claim 1, wherein the continuous detonation engine is devoid of a catalyst heater configured to heat a catalyst to a temperature at which the catalyst promotes decomposition of the monopropellant.

4. The continuous detonation engine of claim 1, wherein the detonation initiator includes a pre-detonator assembly, the pre-detonator assembly having a tube or channel fluidly coupled to the detonation wave channel, the pre-detonator assembly being configured to selectively charge the tube or channel with another propellant that is more detonable than the monopropellant, to detonate the other propellant in the tube or channel to generate a donor detonation wave in the tube or channel, and to deliver the donor detonation wave from the tube or channel to the detonation wave channel after the detonation wave channel is charged with the monopropellant to initiate continuous detonation of the monopropellant in the detonation wave channel, the pre-detonator assembly being configured to prevent flow of the other propellant during continuous detonation of the monopropellant.

5. The continuous detonation engine of claim 4, wherein the other propellant includes a bipropellant.

6. The continuous detonation engine of claim 1, wherein the monopropellant feed assembly is configured to prevent upstream travel of shock waves from the detonation wave channel toward the storage tank during an entirety of continuous detonation of the monopropellant in the detonation wave channel.

7. The continuous detonation engine of claim 6, wherein the monopropellant feed assembly defines a plurality of injection paths through which the monopropellant flows into the detonation wave channel, the monopropellant defining a detonation cell size, each of the injection paths having a diameter less than the detonation cell size of the monopropellant.

8. The continuous detonation engine of claim 7, wherein the monopropellant feed assembly has a continuous-detonation barrier, the plenum extending along the detonation wave channel and being configured to receive monopropellant from the storage tank, the continuous-detonation barrier extending along the detonation wave channel and being disposed between the plenum and the detonation wave channel, the continuous-detonation barrier defining the injection paths.

9. The continuous detonation engine of claim 8, wherein the continuous-detonation barrier defines discrete injection ports that fluidly couple the plenum to the detonation wave channel, each of the discrete injection ports defining one of the injection paths.

10. The continuous detonation engine of claim 9, wherein each of the discrete injection ports has a length of at least ten times the diameter.

11. The continuous detonation engine of claim 1, wherein the monopropellant feed assembly includes a catalyst configured to promote partial decomposition of a component of the monopropellant to improve detonability of the monopropellant.

12. The continuous detonation engine of claim 1, wherein the detonation wave channel defines a non-circular guide path, including a first end portion of the detonation wave channel and a second end portion of the wave channel opposite the first end portion.

13. The continuous detonation engine of claim 1, wherein the continuous detonation engine is a continuous detonation rocket engine.

14. A system comprising:
    the continuous detonation engine of claim 1; and
    a device downstream of the continuous detonation engine,
    wherein the continuous detonation engine is configured to not provide direct propulsion,
    wherein the continuous detonation engine is configured to discharge exhaust gases from the continuous detonation of the monopropellant in the detonation wave channel to the device downstream of the continuous detonation engine,
    wherein the device downstream of the continuous detonation engine is configured to receive the discharge gases and to utilize the discharge gases in facilitating generation of greater thrust than produced by the continuous detonation engine.

15. The system of claim 14, wherein the device includes an electrothermal thruster, an arcjet, or a turbine.

16. An apparatus having the continuous detonation engine of claim 1, the apparatus comprising a satellite, a missile, or an autonomous kill vehicle.

17. A method of operating a continuous detonation engine, the method comprising:
    providing the continuous detonation engine of claim 1;
    injecting the monopropellant into the detonation wave channel;
    initiating a detonation wave through the monopropellant in the detonation wave channel; and
    continuously injecting the monopropellant into the detonation wave channel to promote continuous detonation of the monopropellant in the detonation wave channel, whereby specific impulse is increased compared to constant-pressure reaction thrusters that catalytically decompose the monopropellant with deflagration combustion.

18. The method of claim 17, wherein the monopropellant is detonated without catalytic decomposition promoted by a catalytic heater.

19. The method of claim 17, wherein initiating the detonation wave through the monopropellant includes:
- charging the detonation wave channel with the monopropellant;
- charging a tube or channel with another propellant, the tube or channel being fluidly coupled to the detonation wave channel, the other propellant being more detonable than the monopropellant;
- detonating the other propellant in the tube or channel to generate a donor detonation wave in the tube or channel;
- delivering the donor detonation wave from the tube or channel to the detonation wave channel to initiate continuous detonation of the monopropellant in the detonation wave channel; and
- discontinuing flow of the other propellant during continuous detonation of the monopropellant.

20. The continuous detonation engine of claim 17, wherein the monopropellant includes hydroxylammonium-nitrate-based propellant or ammonium-dinitramide-based propellant.

\* \* \* \* \*